(12) United States Patent
Matsumori et al.

(10) Patent No.: US 8,734,917 B2
(45) Date of Patent: *May 27, 2014

(54) LIQUID CRYSTAL DISPLAY DEVICE

(71) Applicants: Japan Display Inc., Tokyo (JP);
Panasonic Liquid Crystal Display Co., Ltd., Hyogo-Ken (JP)

(72) Inventors: Masaki Matsumori, Naka-gun (JP);
Yasushi Tomioka, Hitachinaka (JP)

(73) Assignees: Japan Display Inc., Tokyo (JP);
Panasonic Liquid Crystal Display Co., Ltd., Hyogo-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/930,139

(22) Filed: Jun. 28, 2013

(65) Prior Publication Data

US 2013/0293814 A1 Nov. 7, 2013

Related U.S. Application Data

(63) Continuation of application No. 13/028,360, filed on Feb. 16, 2011, now Pat. No. 8,580,357.

(30) Foreign Application Priority Data

Mar. 9, 2010 (JP) .................................. 2010-052318

(51) Int. Cl.
*G02F 1/1337* (2006.01)
(52) U.S. Cl.
USPC ....................................... 428/1.26; 349/124

(58) Field of Classification Search
USPC ................. 428/1.25–1.26; 349/123–124, 135
See application file for complete search history.

(56) References Cited

U.S. PATENT DOCUMENTS

| 8,580,357 B2 * | 11/2013 | Matsumori et al. .......... 428/1.26 |
| 2005/0271833 A1 | 12/2005 | Matsumori et al. |
| 2006/0061719 A1 | 3/2006 | Tomioka et al. |
| 2009/0053430 A1 | 2/2009 | Matsumori et al. |
| 2010/0165278 A1 | 7/2010 | Matsumori et al. |

FOREIGN PATENT DOCUMENTS

| JP | 2009-048174 | 3/2009 |
| JP | 2009-75569 | 4/2009 |
| JP | 2010-152188 | 7/2010 |

* cited by examiner

*Primary Examiner* — Sophie Hon
(74) *Attorney, Agent, or Firm* — Antonelli, Terry, Stout & Kraus, LLP.

(57) ABSTRACT

A liquid crystal display device includes: a pair of substrates, at least one of which is transparent; a liquid crystal layer placed between the pair of substrates; an electrode group, formed on at least one of the pair of substrates, for applying an electric field to the liquid crystal layer; and an alignment control film placed on at least one of the pair of substrates, in which the alignment control film is formed of polyimide and a precursor of the polyimide, each of the polyimide and the precursor of the polyimide contains, as a material, a specific cyclobutanetetracarboxylic acid dianhydride derivative and aromatic diamine, and the alignment control film is provided with alignment capability by photo-alignment treatment.

1 Claim, 10 Drawing Sheets

LIQUID CRYSTAL DISPLAY DEVICE

CROSS-REFERENCE TO RELATED APPLICATION

This application is a continuation application of U.S. application Ser. No. 13/028,360, filed Feb. 16, 2011, the contents of which are incorporated herein by reference.

The present application claims priority from Japanese application JP 2010-052318 filed on Mar. 9, 2010, the content of which is hereby incorporated by reference into this application.

BACKGROUND OF THE INVENTION

1. Field of the Invention

The present invention relates to a liquid crystal display device.

2. Description of the Related Art

Japanese Patent Application Laid-open No. 2009-48174, as a related art, aims to provide a liquid crystal alignment agent with a high-voltage retention ratio and a low image-sticking property, and discloses the provision of a liquid crystal alignment agent which is composed of polyamide acid obtained by using, as at least a part of the tetracarboxylic acid dianhydride and the diamine compound, 1,2,3,4-cyclobutanetetracarboxylic acid dianhydride derivative, and 1,4-diaminocyclohexane, bicyclo[2.2.1]heptane-2,6-bis(methylamine), 1,3-bis(aminomethyl)cyclohexane, isophorone, or an alkyl substitution product of those diamines; an imidized polymer; or a mixture with another imidized polymer, and which has a ratio of an amic acid bond unit of 5 to 80%. The liquid crystal alignment agent disclosed in Japanese Patent Application Laid-open No. 2009-48174 is provided with alignment capability by rubbing alignment treatment.

SUMMARY OF THE INVENTION

However, the rubbing alignment treatment includes a step of allowing an organic coating film and a cloth to rub against each other physically. Therefore, unwanted shavings may be generated on the surface of the alignment film formed. The shavings cause display defects in a liquid crystal display device. Consequently, there is a demand for the establishment of clean alignment treatment, e.g., photo-alignment treatment that can replace the rubbing alignment treatment.

The photo-alignment treatment is a method of providing a surface of an organic coating film with alignment capability through irradiation of substantially linearly polarized light onto the surface of the organic coating film formed on the surface of a substrate. In order to effectively utilize the energy of light to be irradiated, it is necessary to use a liquid crystal alignment agent with high sensitivity with respect to light.

An object of the present invention is to provide a liquid crystal display device having an alignment control film with high sensitivity with respect to light. Further, the above-mentioned object and other objects, and novel features of the present invention are clarified by the descriptions and the attached drawings of the specification.

A liquid crystal display device according to the present invention includes:

a pair of substrates, at least one of which is transparent;

a liquid crystal layer placed between the pair of substrates;

an electrode group, formed on at least one of the pair of substrates, for applying an electric field to the liquid crystal layer; and an alignment control film placed on at least one of the pair of substrates, in which the alignment control film is formed of polyimide and a precursor of the polyimide, each of the polyimide and the precursor of the polyimide contains, as a material, a cyclobutanetetracarboxylic acid dianhydride derivative represented by the following chemical formula (1) and aromatic diamine, and the alignment control film is provided with alignment capability by photo-alignment treatment:

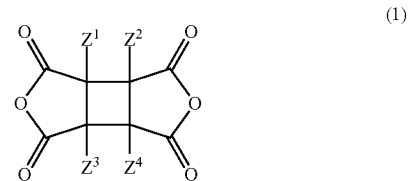

(1)

where at least one of $Z^1$ to $Z^4$ is a substituent represented by $-NR_2$, $-SR$, $-OH$, $-COR$, $-(CH_2)_n-COOR$, $-CN$, or $-NO_2$ (R's each independently represent a hydrogen atom or an alkyl group having a carbon number of 1 to 4, and n represents an integer of 0 to 2), and the others are hydrogen atoms.

Further, the aromatic diamine may contain at least one kind of aromatic diamines selected from the compound group represented by the following chemical formulae (101) to (110):

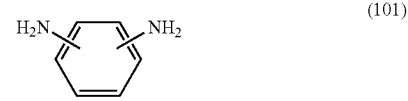

(101)

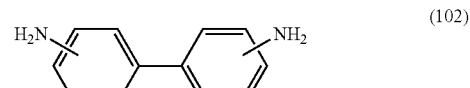

(102)

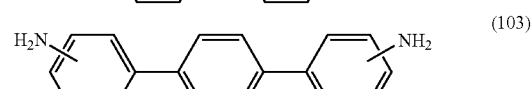

(103)

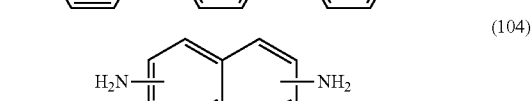

(104)

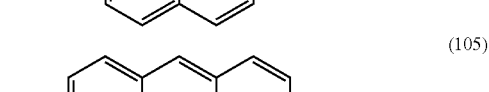

(105)

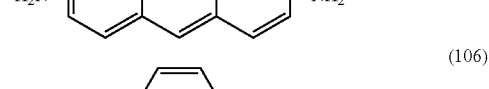

(106)

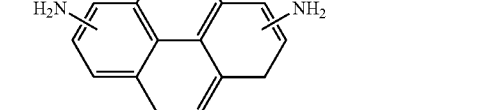

(107)

-continued

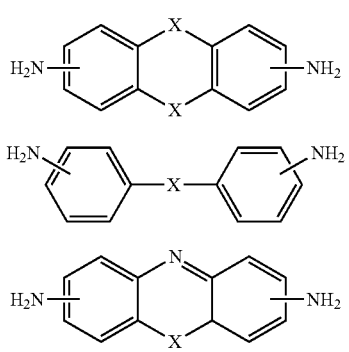

where X's each independently have any one of the following structures: —CH$_2$—, —CO—, —O—, —NH—, —CO—NH—, —S—, —SO—, and —SO$_2$—.

Further, the aromatic diamine may contain at least two different kinds of aromatic diamines selected from the compound group represented by the chemical formulae (101) to (110).

Further, a tetracarboxylic acid dianhydride used as a material for the polyimide and the precursor of the polyimide may contain 1,2,3,4-cyclobutanetetracarboxylic acid dianhydride derivative represented by the chemical formula (1) in a ratio of 70 mol % to 100 mol %.

Further, in the liquid crystal display device according to the present invention, each of the polyimide and the precursor of the polyimide may further contain, as a material, 1,2,3,4-cyclobutanetetracarboxylic acid dianhydride derivative represented by the following chemical formula (2):

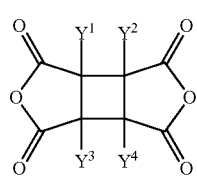

(2)

where at least one of Y$^1$ to Y$^4$ is a methyl group or a methoxy group, and the others are hydrogen atoms.

In the liquid crystal display device according to the present invention, the precursor of the polyimide may contain a polyamide acid alkyl ester having an alkyl group of a carbon number of 1 to 4. Further, the electrode group may be formed on only any one of the pair of substrates. In addition, a pretilt angle of the liquid crystal layer is 1 degree or less.

Further, at least two of Z$^1$ to Z$^4$ in the chemical formula (1) may be substituents each represented by —NR$_2$, —SR, —OH, —COR, —(CH$_2$)$_n$—COOR, —CN, or —NO$_2$ (R's each independently represent a hydrogen atom or an alkyl group having a carbon number of 1 to 4, and n represents an integer of 0 to 2), and the others may be hydrogen atoms.

Further, each of the polyimide and the precursor of the polyimide may contain, as a material, at least two kinds of the cyclobutanetetracarboxylic acid dianhydride derivatives each represented by the chemical formula (1) and having different number of substituents.

According to the present invention, the liquid crystal display device having an alignment control film with high sensitivity with respect to light can be provided. The other effects of the present invention are clarified from the entire description of the specification.

DETAILED DESCRIPTION OF THE INVENTION

Figure 1:
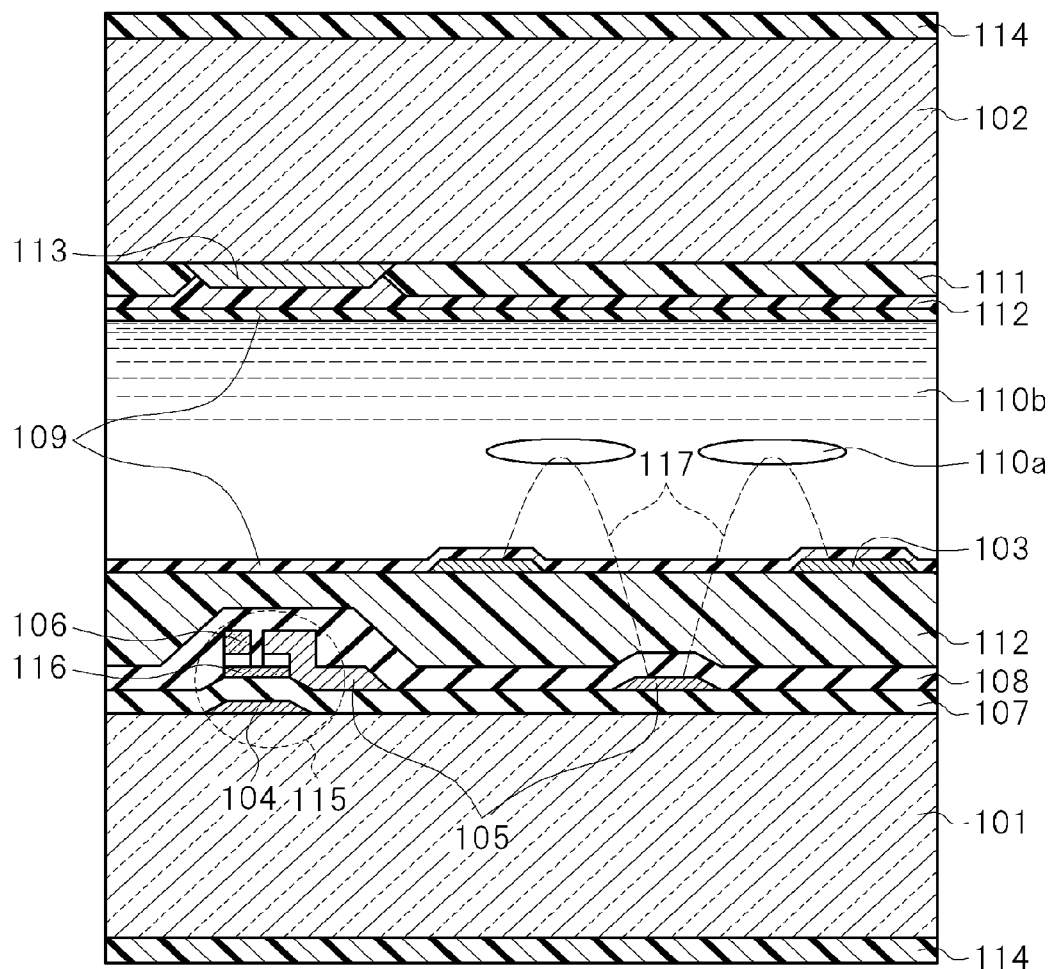
FIG. 1 is a schematic cross-sectional view in the vicinity of one pixel of a liquid crystal display device according to Example 1.

As a rubbing-less alignment method for solving the problems of the rubbing alignment method, a photo-alignment method involving irradiation of light has been proposed and studied. However, the photo-alignment method involves the following practical problems. In polymer materials in each of which a light reactive group is introduced into a polymer side chain typified by polyvinyl cinnamate, and the like, thermal stability of alignment is not sufficient, and hence sufficient reliability is not obtained yet in terms of practicality.

Further, in this case, it is conceivable that the structural site that develops the alignment of liquid crystal is a polymer side chain portion. Therefore, the above-mentioned alignment method is not always preferred in more uniformly aligning liquid crystal molecules and obtaining stronger alignment.

Further, when a low-molecular dichroic dye is dispersed in a polymer, the dye per se that aligns the liquid crystal has a low molecular weight, and there remains a practical problem in view of the thermal or optical reliability.

A photo-alignment method using photolysis of cyclobutane-based polyimide is an effective method high in the stability of alignment. However, in recent years, there is an increasing need for the stability of alignment, and the conventional cyclobutane-based polyimide material cannot satisfy this need. Further, the cyclobutane-based polyimide requires a large amount of light for light reaction, and hence has a problem of a low production throughput.

An object of the present invention is to provide a liquid crystal display device having an alignment control film with high sensitivity with respect to light. Thus, a liquid crystal display device is provided, which solves such a problem that a production margin of alignment treatment is small, reduces occurrences of display defects caused by fluctuation in an initial alignment direction, realizes stable liquid crystal alignment, and has high definition image quality with a contrast ratio enhanced.

In the liquid crystal display device according to the present invention, the alignment control film is formed of polyimide and a precursor of the polyimide, each of the polyimide and the precursor of the polyimide contains, as a material, a cyclobutanetetracarboxylic acid dianhydride derivative represented by the following chemical formula (1) and aromatic diamine, and the alignment control film is provided with alignment capability by photo-alignment treatment:

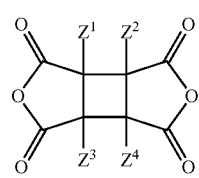
(1)

where at least one of $Z^1$ to $Z^4$ is a substituent represented by —$NR_2$, —SR, —OH, —COR, —$(CH_2)_n$—COOR, —CN, or —$NO_2$ (R's each independently represent a hydrogen atom or an alkyl group having a carbon number of 1 to 4, and n represents an integer of 0 to 2), and the others are hydrogen atoms.

Further, R's may each independently represent a hydrogen atom or an alkyl group having a carbon number of 1 to 3, and n may represent an integer of 0 to 2. Further, R's may each independently represent a hydrogen atom or an alkyl group having a carbon number of 1 or 2, and n may represent an integer of 0 to 2. Further, R's may each independently represent a hydrogen atom or a methyl group, and n may represent an integer of 0 to 2.

A cyclobutanetetracarboxylic acid dianhydride derivative represented by the chemical formula (1) to be a material for polyimide and a precursor thereof forming an alignment control film according to the present invention is exemplified by, for example, the compound group B represented by the following the chemical formulae (B-1) to (B-18). The compounds represented by the compound group B each merely show an example, and the derivative is not limited thereto.

[Compound group B]

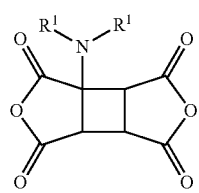
(B-1)

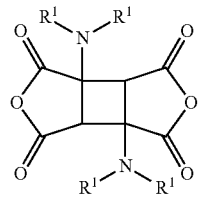
(B-2)

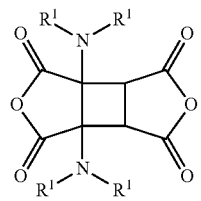
(B-3)

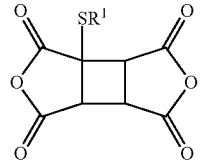
(B-4)

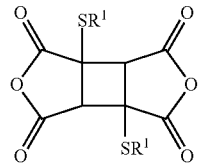
(B-5)

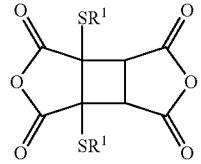
(B-6)

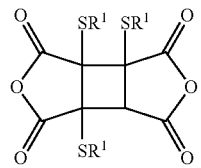
(B-7)

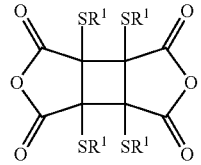
(B-8)

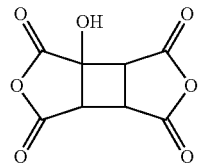
(B-9)

-continued (B-10) 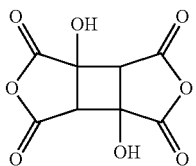

(B-11) 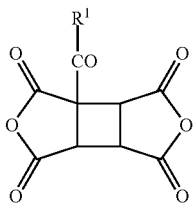

(B-12) 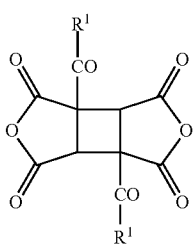

(B-13) 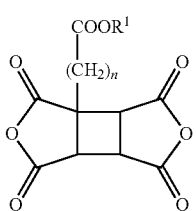

(B-14) 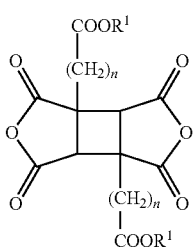

(B-15) 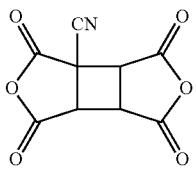

(B-16) 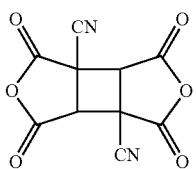

(B-17) 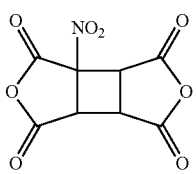

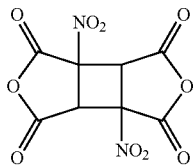
(B-18)

where $R^1$'s in the compounds represented by the compound group B each independently represent a hydrogen atom or an alkyl group having a carbon number of 1 to 4, and n represents an integer of 0 to 2.

Of the above-mentioned compound group B, (B-1), (B-2), (B-3), (B-4), (B-5), (B-6), (B-7), and (B-8) each have a high light reactivity, in particular, (B-1), (B-2), and (B-3) each have a very high light reactivity, thereby being particularly effective.

More specifically, in the compound represented by the above-mentioned chemical formula (1), it is preferred that at least one of $Z^1$ to $Z^4$ be a substituent represented by —$NR_2$ (R's each independently represent a hydrogen atom or an alkyl group having a carbon number of 1 to 4), and the others are hydrogen atoms. Further, R's may each independently represent a hydrogen atom or an alkyl group having a carbon number of 1 to 3, and n may represent an integer of 0 to 2. Further, R's may each independently represent a hydrogen atom or an alkyl group having a carbon number of 1 to 2, and n may represent an integer of 0 to 2. Further, R's may each independently represent a hydrogen atom or a methyl group, and n may represent an integer of 0 to 2.

Further, in the compound represented by the above-mentioned chemical formula (1), at least one of $Z^1$ to $Z^4$ may be a substituent represented by —NHR (R's each independently represent a hydrogen atom or an alkyl group having a carbon number of 1 to 4), and the others may be hydrogen atoms. Further, R's may each independently represent a hydrogen atom or an alkyl group having a carbon number of 1 to 3, and n may represent an integer of 0 to 2. Further, R's may each independently represent a hydrogen atom or an alkyl group having a carbon number of 1 to 2, and n may represent an integer of 0 to 2. Further, R's may each independently represent a hydrogen atom or a methyl group, and n may represent an integer of 0 to 2.

Further, in the compound represented by the above-mentioned chemical formula (1), at least one of $Z^1$ to $Z^4$ may be a substituent represented by —$NH_2$, and the others may be hydrogen atoms.

Further, it is preferred that polyimide and a precursor thereof forming the alignment control film in the display device according to the present invention further contain a cyclobutanetetracarboxylic acid dianhydride derivative represented by the following chemical formula (2) as a material in addition to the compound group B:

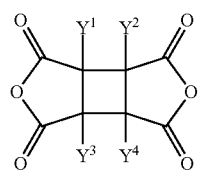
(2)

where at least one of $Y^1$ to $Y^4$ is a methyl group or a methoxy group, and the others are hydrogen atoms.

Further, at least two of $Y^1$ to $Y^4$ in the chemical formula (2) may be methyl groups or methoxy groups, and the others may be hydrogen atoms. Further, at least one of $Y^1$ to $Y^4$ in the chemical formula (2) may be a methyl group, and the others may be hydrogen atoms or methoxy groups. Further, at least two of $Y^1$ to $Y^4$ in the chemical formula (2) may be methyl groups, and the others may be hydrogen atoms or methoxy groups.

A specific example of the cyclobutanetetracarboxylic acid dianhydride derivative represented by the chemical formula (2) is shown in the compound group C represented by the following chemical formulae (C-1) to (C-6). The compounds shown in the compound group C each merely show an example, and the derivative is not limited thereto.

[Compound group C]

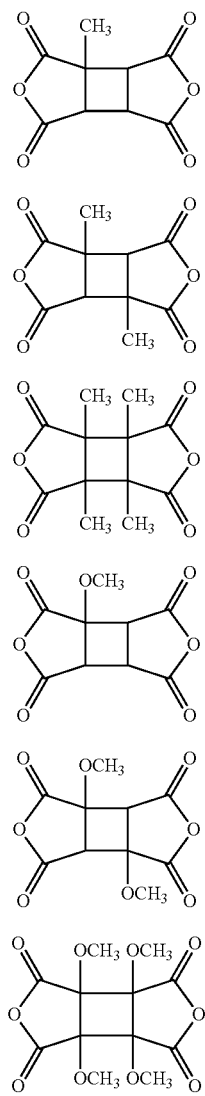

It is particularly effective to contain the cyclobutanetetracarboxylic acid dianhydride derivative represented by the above-mentioned compound group C because liquid crystal alignment stability is enhanced.

Further, it is preferred that each of polyimide and a precursor thereof forming the alignment control film in the display device according to the present invention contain, as a material, at least one kind of aromatic diamines selected from the compound group represented by the following chemical formulae (101) to (110):

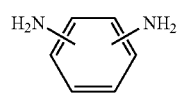

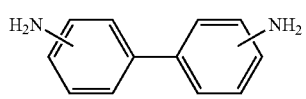

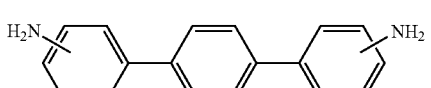

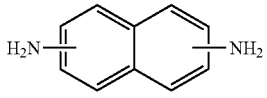

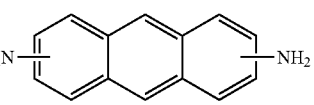

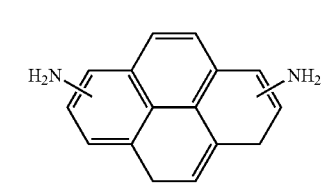

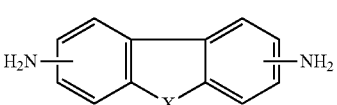

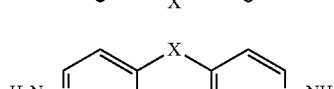

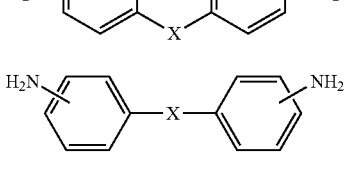

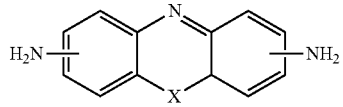

where X's each independently have any one of the following structures: —$CH_2$—, —CO—, —O—, —NH—, —CO—NH—, —S—, —SO—, and —$SO_2$—.

A group of compounds A represented by the chemical formulae (A-1) to (A-67) below are given as specific structural examples of the aromatic diamine, which serves as a raw material for the polyimide and the polyimide precursor each forming the alignment control film according to the present invention. Each of those structures is merely an example of specific chemical structures, and the present invention is not limited to those structures.

[Compound group A]
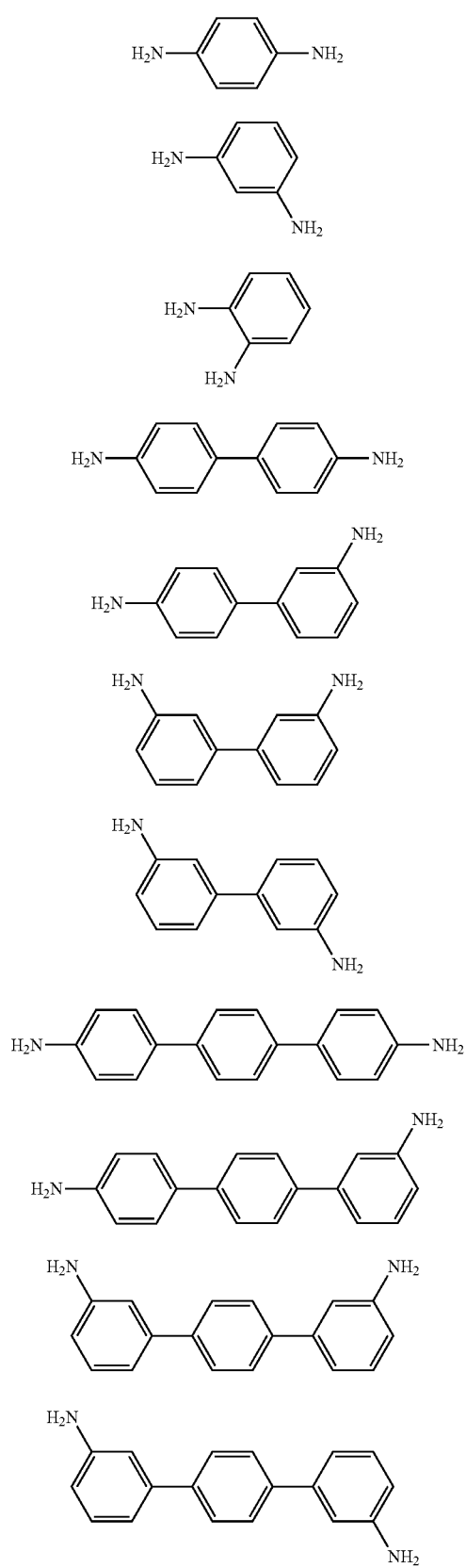
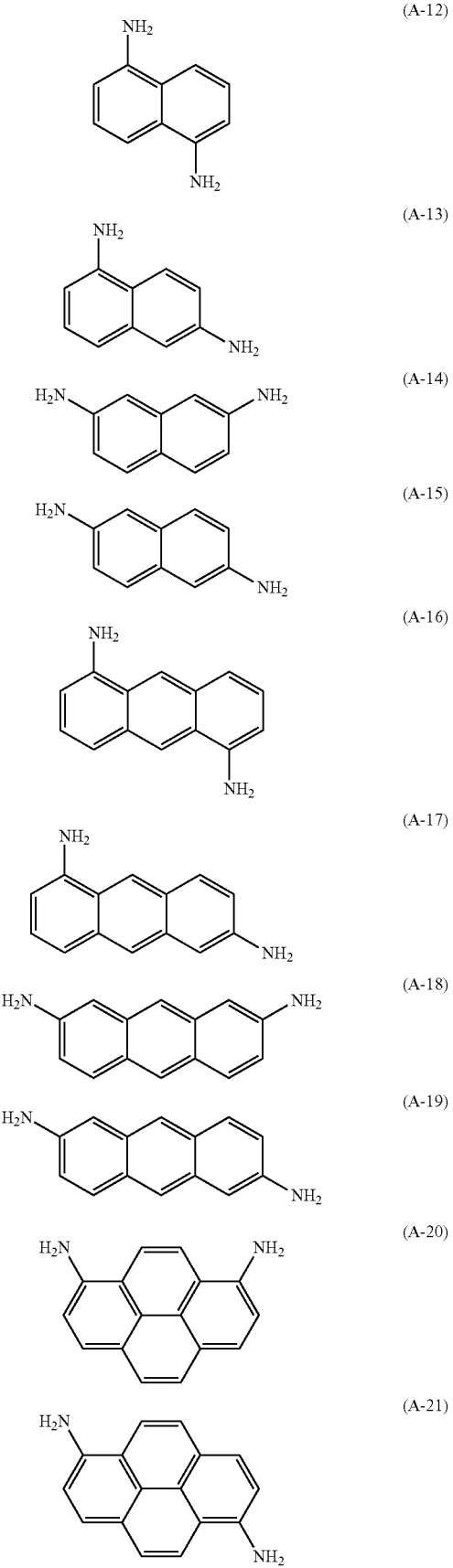

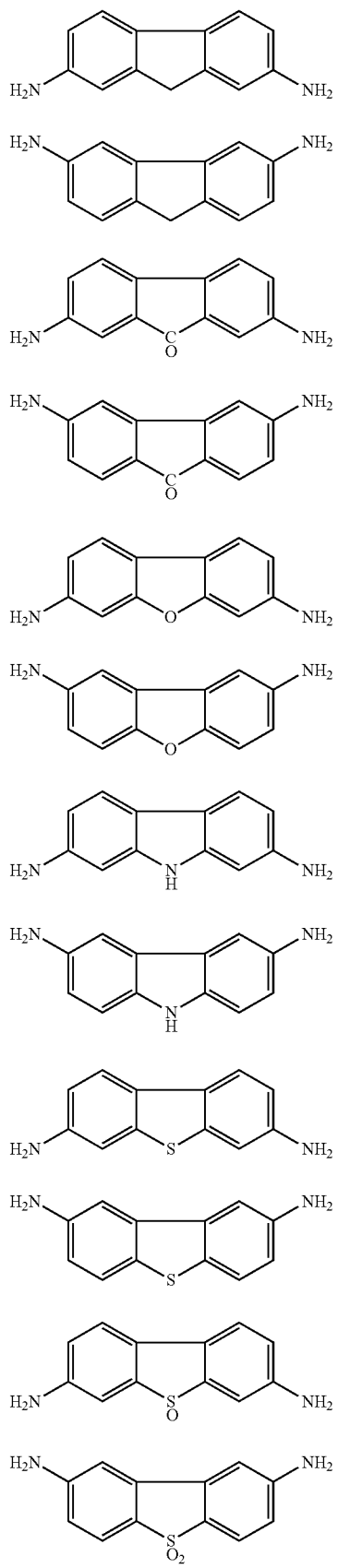
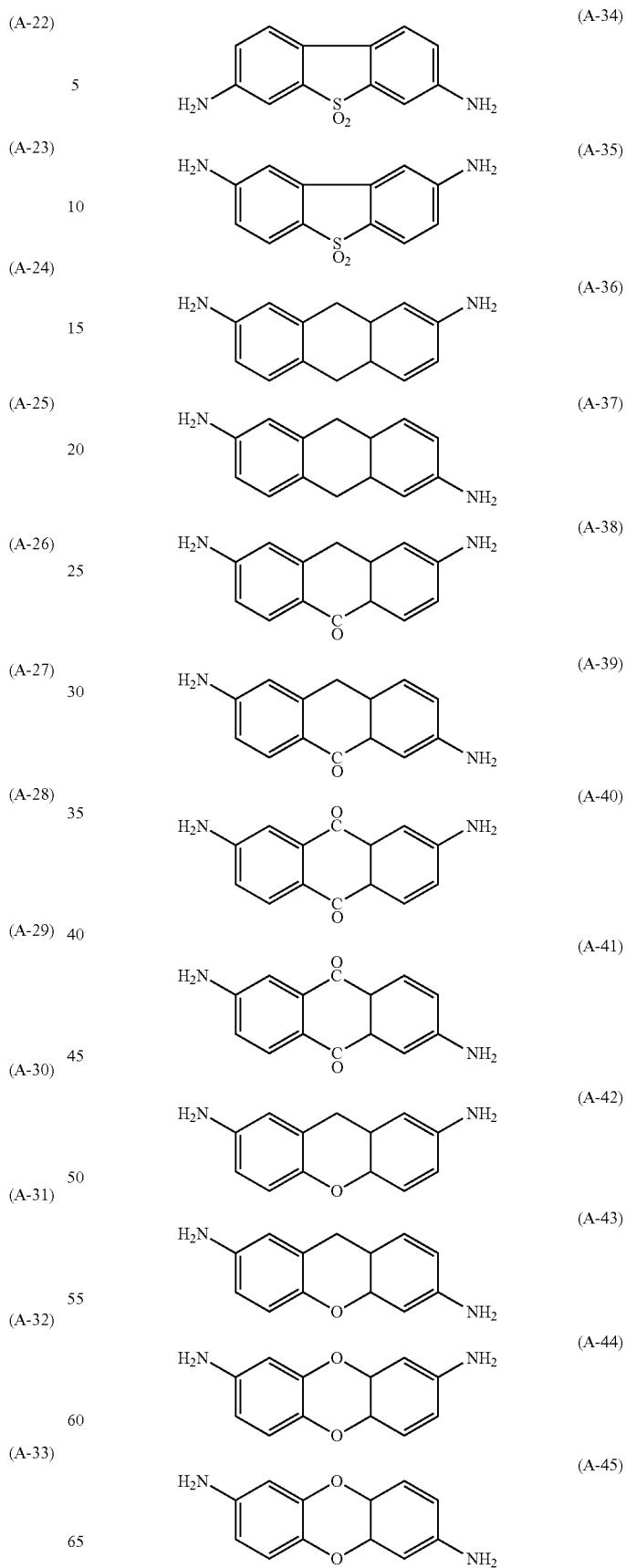

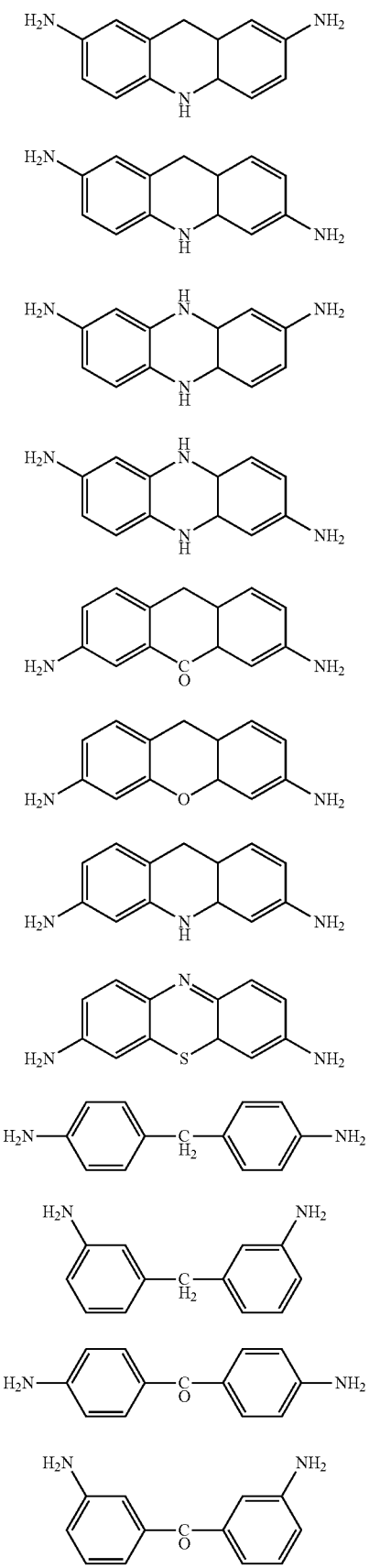
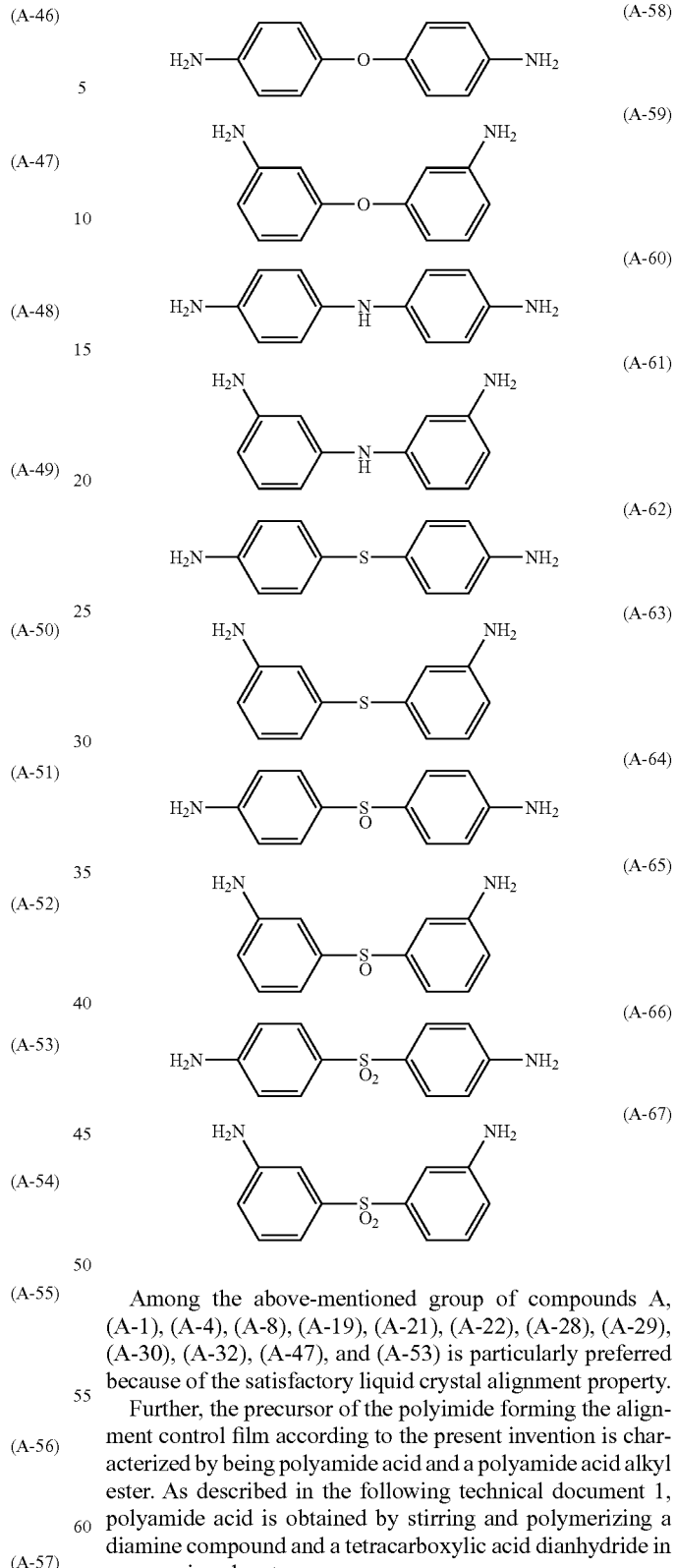

Among the above-mentioned group of compounds A, (A-1), (A-4), (A-8), (A-19), (A-21), (A-22), (A-28), (A-29), (A-30), (A-32), (A-47), and (A-53) is particularly preferred because of the satisfactory liquid crystal alignment property.

Further, the precursor of the polyimide forming the alignment control film according to the present invention is characterized by being polyamide acid and a polyamide acid alkyl ester. As described in the following technical document 1, polyamide acid is obtained by stirring and polymerizing a diamine compound and a tetracarboxylic acid dianhydride in an organic solvent.

Technical document 1: Latest polyimide, edited by Polyimide Society of Japan, issued by NTS (2002)

Specifically, a diamine compound is dissolved in a polar amide solvent such as NMP. The tetracarboxylic dianhydride having substantially the same moles as those of the diamine compound is added to the solution, and stirred at room temperature. Then, a ring-opening addition polymerization reaction is advanced between the tetracarboxylic dianhydride and the diamine compound in accordance with the dissolution of the tetracarboxylic dianhydride to obtain a polyamide acid having a high molecular weight. Further, in the case of the polyamide acid ester, a chlorinating reagent such as thionyl chloride is allowed to react with a diester dicarboxylic acid obtained by allowing an alcohol to react with a tetracarboxylic dianhydride, to thereby obtain a high-reactive diester dicarboxylic chloride. The diester dicarboxylic chloride is allowed to react with a diamine compound for polycondensation to obtain a polyamide acid alkyl ester.

In this situation, a plurality of kinds of diamine compounds and tetracarboxylic dianhydrides as raw materials may be mixed together, to thereby obtain a copolymer in which a plurality of chemical species are polymerized in one polymer chain.

When a plurality of kinds of aromatic diamine components as shown in the above-mentioned group of compounds A are mixed together, the absorption wavelength range of the generated polyimide is widened. Therefore, the spectrum of a light source for emission can be effectively utilized.

More specifically, in the polyimide and the precursor thereof forming the alignment control film according to the present invention, it is preferred that the aromatic diamine contain at least two different kinds of aromatic diamines selected from the compound group represented by the chemical formulae (101) to (110).

Further, diamine used as a material for a polyimide precursor forming the alignment control film according to the present invention contains at least one kind of aromatic diamines selected from the compound group represented by the chemical formulae (101) to (110) preferably in an amount of 50 mol % to 100 mol %, more preferably in an amount of 70 mol % to 100 mol %, particularly preferably in an amount of 80 mol % to 100 mol %. Such configuration enhances the light reactivity, and the alignment stability of liquid crystal is enhanced.

Further, each of the polyimide and the precursor thereof forming the alignment control film according to the present invention contains, as a material, at least one kind of the cyclobutanetetracarboxylic acid dianhydride derivatives represented by the chemical formula (1) and also exemplified by the compound group B preferably in an amount of 70 mol % to 100 mol %, more preferably in an amount of 80 mol % to 100 mol %, particularly preferably in an amount of 90 mol % to 100 mol %. Such configuration enhances the light reactivity, and the alignment stability of liquid crystal is also enhanced.

Further, in the case where a plurality of substituents of $Z^1$ to $Z^4$ in the chemical formula (1) are substituents each represented by —$NR_2$, —SR, —OH, —COR, —$(CB_2)_n$—COOR, —CN, or —$NO_2$ (R's each independently represent a hydrogen atom or an alkyl group having a carbon number of 1 to 4, and n represents an integer of 0 to 2), the light reactivity is enhanced further, and the alignment stability of liquid crystal is also enhanced.

More specifically, it is preferred that at least two of $Z^1$ to $Z^4$ in the chemical formula (1) be substituents each represented by —$NR_2$, —SR, —OH, —COR, —$(CH_2)_n$—COOR, —CN, or —$NO_2$ (R's each independently represent a hydrogen atom or an alkyl group having a carbon number of 1 to 4, and n represents an integer of 0 to 2), and the others are hydrogen atoms.

Further, as the substituents each represented by —$NR_2$, —SR, —OH, —COR, —$(CH_2)_n$—COOR, —CN, or —$NO_2$ (R's each independently represent a hydrogen atom or an alkyl group having a carbon number of 1 to 4, and n represents an integer of 0 to 2) are more substituted in the chemical formula (1), the light reactivity is enhanced more, and the alignment stability of liquid crystal is also enhanced.

Incidentally, in the case where a cyclobutanetetracarboxylic acid dianhydride derivative represented by the chemical formula (1) and also exemplified by the compound group B is used as a simple substance, when the cyclobutanetetracarboxylic acid dianhydride derivative has such a structure that a ring-opening addition polymerization reactivity with diamine is low, a ring-opening addition polymerization reaction does not proceed sufficiently, and hence a high molecular weight substance may not be obtained.

The reason for this cannot be determined uniquely because it may vary depending upon the reaction conditions of the ring-opening addition polymerization reaction. For example, it is considered that the ring-opening addition polymerization reaction does not proceed sufficiently depending upon the combination of the number and kinds of substituents contained in the structure of the cyclobutanetetracarboxylic acid dianhydride derivative.

If the ring-opening addition polymerization reaction does not proceed sufficiently, the molecular weight of the polyimide to be formed and the precursor thereof decreases to degrade a film formation property, which may cause such a problem that the film surface becomes uneven. However, the above-mentioned problem can be solved by using a mixture of a plurality of kinds of cyclobutanetetracarboxylic acid dianhydride derivatives having different ring-opening addition polymerization reactivities with aromatic diamine, to thereby obtain a polyimide and a precursor thereof having a sufficiently high molecular weight.

For example, it is preferred that each of the polyimide and the precursor thereof contain, as a material, at least two kinds of cyclobutanetetracarboxylic acid dianhydride derivatives having different number of substituents, represented by the chemical formula (1). When each of the polyimide and the precursor thereof contains, as a material, at least two kinds of cyclobutanetetracarboxylic acid dianhydride derivatives having different number of substituents, represented by the chemical formula (1), an alignment control film having a high light reactivity and alignment stability of liquid crystal can be formed.

For example, when each of the polyimide and the precursor thereof contains, as a material, a cyclobutanetetracarboxylic acid dianhydride derivative (one of $Z^1$ to $Z^4$ is a substituent represented by —$NR_2$, —SR, —OH, —COR, —$(CH_2)_n$—COOR, —CN, or —$NO_2$, R's each independently represent a hydrogen atom or an alkyl group having a carbon number of 1 to 4, and n represents an integer of 0 to 2.) represented by the chemical formula (1) having one substituent, and the cyclobutanetetracarboxylic acid dianhydride derivative (one of $Z^1$ to $Z^4$ is a substituent represented by —$NR_2$, —SR, —OH, —COR, —$(CH_2)_n$—COOR, —CN, or —$NO_2$, R's each independently represent a hydrogen atom or an alkyl group having a carbon number of 1 to 4, and n represents an integer of 0 to 2.) represented by the chemical formula (1) having 2, 3, or 4 substituents, an alignment control film having a high light reactivity and alignment stability of liquid crystal can be formed.

The polyimide forming the alignment control film according to the present invention is characterized by being obtained by allowing the imidization reaction of polyamide acid or a polyamide acid ester that is a precursor of the polyamide to proceed by heating or chemical imidization. A plurality of kinds of polyimide precursors may be mixed, and for example, polyamide acid and a polyamide acid ester may be mixed.

Further, it is not necessarily required that the imidization reaction proceeds 100% in this case. The imidization reaction proceeds preferably 50% to 100%, more preferably 60% to 95%, still more preferably 70% to 90% of the total reaction. As the degree of progress of the imidization reaction is higher, light alignment property and the alignment stability of liquid crystal are more enhanced. However, when the degree of progress is too high, the specific resistance of the alignment control film becomes too high, which is not preferred in terms of electrical properties.

The alignment control film according to the present invention can be used by blending a material having a low specific resistance. This is effective because the specific resistance of the alignment control film can be decreased, and consequently, burning is hard to occur. The material having a low resistance may be another polymer having a high electric conductivity to be mixed with a polyimide and a precursor thereof. Aromatic diamine that has no side chain component having a carbon number of at least 2 may be used as a material for the polyimide and the precursor thereof.

It is also desired that the molecular weight of the polyimide forming the alignment control film be higher, and a polyamide acid alkyl ester is more preferred because the reduction in molecular weight during heating does not occur unlike polyamide acid, which enhances the alignment stability of liquid crystal.

When cyclobutane-based polyimide is irradiated with light, a photolytic reaction involving the cleavage of the ring structure of cyclobutane to generate a maleimide terminal occurs. As the reaction speed of the photolytic reaction is higher, the reaction proceeds with less light amount, therefore, there is an advantage of an increase in throughput in terms of production.

However, there is such a problem that the light reaction efficiency of the conventional cyclobutane-based polyimide is low, which is insufficient for the production process. The inventors of the present invention found that, when a certain kind of substituent is introduced into a cyclobutane ring, a photolytic reaction proceeds very fast. The cyclobutane-based polyimide according to the present invention has very high light reaction efficiency, and hence has features of a high throughput and excellent alignment stability.

Hereinafter, examples of the present invention are described in detail with reference to the accompanying drawings. The alignment control film according to the present invention, which is used in the examples, is merely an example, and the same effects have been confirmed in other structures. In the following description, a substrate on which an active element such as a thin film transistor is formed is called "active matrix substrate". Further, when a counter substrate is provided with a color filter, the substrate is also called "color filter substrate". Further, in the present invention, a desired contrast as a target is 500:1 or more, and a target period of time when the residual image is eliminated is desirably 5 minutes or less. The period of time when the residual image is eliminated is determined according to a method defined in the following examples.

EXAMPLES

Example 1

Figure 2A:
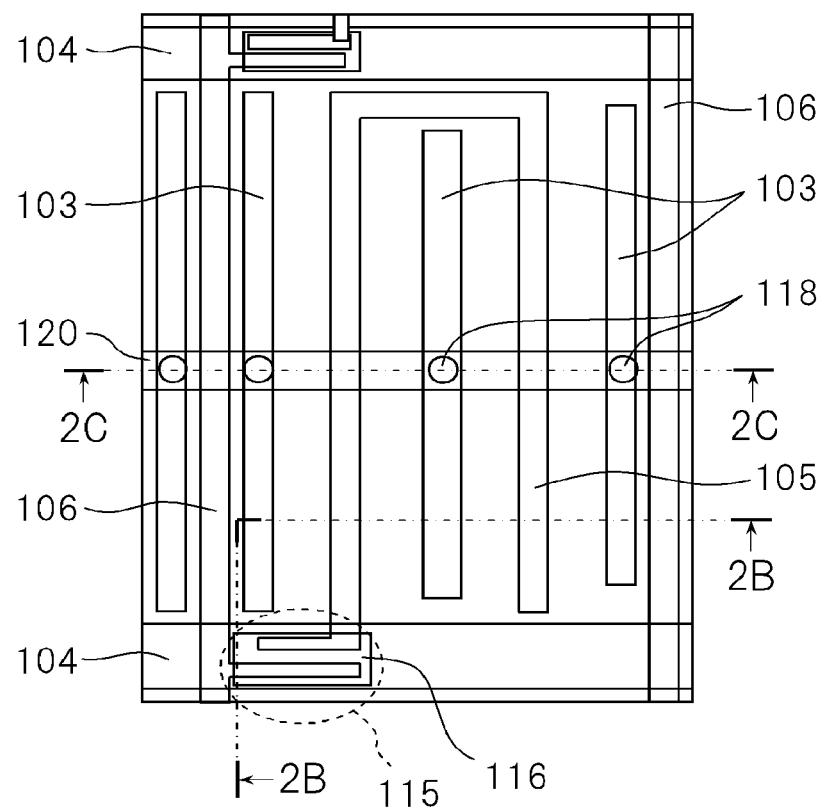
FIG. 2A is a schematic plan view of an active matrix substrate illustrating a configuration in the vicinity of one pixel of the liquid crystal display device according to Example 1.
Figure 2B:
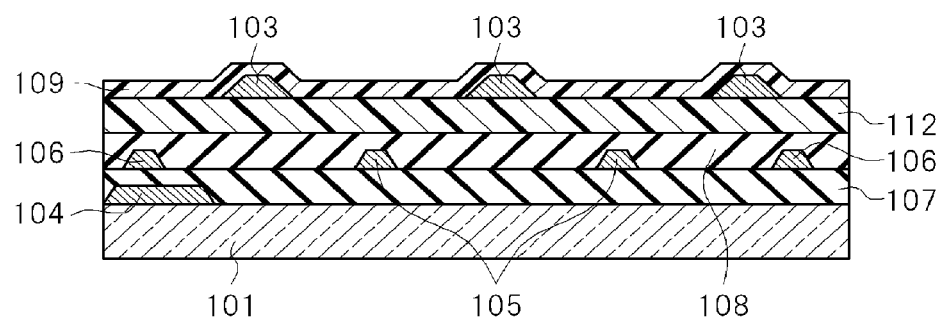
FIG. 2B is a cross-sectional view taken along the line 2B of FIG. 2A.
Figure 2C:
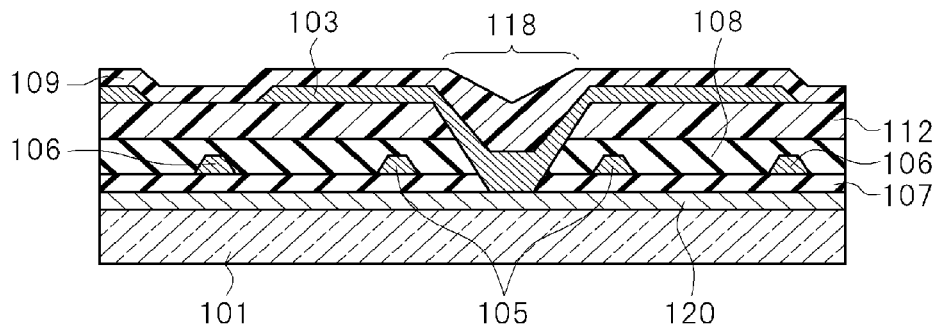
FIG. 2C is a cross-sectional view taken along the line 2c of FIG. 2A.

FIG. 1 is a schematic cross-sectional view in the vicinity of one pixel of a liquid crystal display device according to Example 1. Further, FIG. 2A is a schematic plan view of an active matrix substrate illustrating a configuration in the vicinity of one pixel of the liquid crystal display device according to Example 1. FIG. 2B is a cross-sectional view taken along the line 2B of FIG. 2A. FIG. 2C is a cross-sectional view taken along the line 2C of FIG. 2A. Further, FIG. 1 corresponds to apart of the cross-section taken along the line 2B of FIG. 2A.

FIGS. 2B and 2C emphasize and schematically illustrate configurations of main portions, and do not correspond one by one to cut portions of the line 2B and the line 2C in FIG. 2A. For example, a semiconductor film 116 is not illustrated in FIG. 2B, and only one through-hole 118 that connects each common electrode 103 and a common line 120 is representatively illustrated in FIG. 2C.

In this example, scanning lines (gate electrodes) 104 and the common electrode line (common line) 120 which are made of chrome (Cr) are arranged on a glass substrate 101 as the active matrix substrate, and a gate insulating film 107 made of silicon nitride is so formed as to cover the gate electrodes 104 and the common line 120.

Further, the semiconductor film 116 made of amorphous silicon or polysilicon is arranged above each of the gate electrodes 104 through the gate insulating film 107, and functions as an active layer of each thin film transistor (TFT) 115 serving as the active element. Further, each signal line (drain electrode) 106 and each pixel electrode (source electrode) 105 which are made of chrome/molybdenum (Cr.Mo) are so arranged as to be superimposed on a part of the pattern of the semiconductor film 116, and a protective insulating film 108 made of silicon nitride is so formed as to cover all of those components.

Further, as illustrated in FIG. 2C, the common electrodes 103 that connect to the common line 120 through the through-hole 118 formed through the gate insulating film 107 and the protective insulating film 108 are arranged on an overcoat layer (organic protective film) 112. Further, as illustrated in FIG. 2A, the common electrodes 103 drawn from the common line 120 through the through-hole 118 are so formed as to face the pixel electrodes 105 in a region of one pixel in a planar fashion.

In this example, the pixel electrodes 105 are arranged below the protective insulating film 108 which is disposed below the organic protective film 112, and the common electrodes 103 are arranged on the organic protective film 112. One pixel is configured in a region sandwiched between the plurality of pixel electrodes 105 and the common electrodes 103. Further, an alignment control film 109 is formed on the surface of the active matrix substrate on which the unit pixels configured as described above are arranged in matrix, that is, on the organic protective film 112 on which the common electrodes 103 are formed.

On the other hand, as illustrated in FIG. 1, a color filter layer 111 is arranged on the glass substrate 102 forming the counter substrate so as to be partitioned by a light shield film (black matrix) 113 for each pixel. Further, the color filter layer 111 and the light shield film 113 are covered with the organic protective film 112 made of a transparent insulating material. Further, the alignment control film 109 is also formed on the organic protective film 112 to configure a color filter substrate.

Those alignment control films 109 are imparted liquid crystal alignment capability by irradiation of linearly polarized ultraviolet rays which are extracted with the use of a pile polarizer in which quartz plates are laminated on each other with a high-pressure mercury lamp as a light source.

The glass substrate 101 forming the active matrix substrate and the glass substrate 102 forming the color filter substrate are arranged to face each other at the surfaces of the alignment control films 109, and a liquid crystal layer (liquid crystal composition layer) 110b made up of liquid crystal molecules 110a is arranged between the glass substrate 101 and the glass substrate 102. Further, on the respective outer surfaces of the glass substrate 101 forming the active matrix substrate and the glass substrate 102 forming the color filter substrate, polarization plates 114 are formed.

In the above-mentioned manner, the active matrix liquid crystal display device (TFT liquid crystal display device) using the thin film transistor (TFT) is configured. In the TFT liquid crystal display device, the liquid crystal molecules 110a forming the liquid crystal composition layer 110b are aligned substantially in parallel to the surfaces of the glass substrates 101 and 102 which face each other at the time of applying no electric field. The liquid crystal molecules 110a are homogeneously aligned in a state in which the liquid crystal molecules 110a are directed in an initial alignment direction regulated by the photo-alignment process.

Here, when a voltage is applied to the gate electrodes 104 to turn on the TFT 115, an electric field 117 is applied to the liquid crystal composition layer 110b due to a potential difference between the pixel electrode 105 and the common electrodes 103. The liquid crystal molecules 110a forming the liquid crystal composition layer 110b is turned to the electric field direction due to an interaction of a dielectric anisotropy of the liquid crystal composition layer 110b and the electric field. In this situation, the refractive anisotropy of the liquid crystal composition layer 110b and the action of the polarization plates 114 can change the light transmittance of the liquid crystal display device for display.

Further, the organic protective film 112 may be made of a thermosetting resin such as an acrylic resin, an epoxy acrylic resin, or a polyimide resin which is excellent in insulating property and transparency. Further, the organic protective film 112 may be made of a light curing transparent resin, or an inorganic material such as a polysiloxane resin. Further, the organic protective film 112 may also function as the alignment control film 109.

As described above, according to this example, the liquid crystal alignment control capability of the alignment control film 109 is performed by using not the rubbing alignment process that directly rubs the alignment control film 109 with a buff cloth, but the non-contact photo-alignment method. As a result, uniform alignment can be given to the entire surface of the display region without local disturbance of alignment in the vicinity of the electrodes.

In general, in the IPS system, no interface tilt with the substrate surface is required in principle unlike the vertical electric field system represented by the conventional TN system. It is known that the viewing angle characteristic is more improved as the interface tilt angle becomes smaller. The smaller interface tilt angle is desired even in the photo-alignment control film. In particular, when the interface tilt angle is set to 1 degree or less, changes in color and brightness due to the viewing angle of the liquid crystal display device can be remarkably suppressed, which is effective.

Next, as a method of manufacturing the liquid crystal display device according to this example, the formation of the alignment control film by using the rubbingless alignment method for the liquid crystal alignment control film is described. A flow of a process of forming the alignment control film according to this example includes the following processes (1) to (4).

(1) Coating and formation of the alignment control film (a uniform coating film is formed on the entire surface of the display region).
(2) Imidization baking of the alignment control film (removal of varnish solvent and polyimidization high in heat resistance are enhanced).
(3) Impartation of the liquid crystal alignment capability by irradiation of the polarized light (the uniform alignment capability is imparted to the display region).
(4) Enhancement and stabilization of the alignment capability (by heating, infrared radiation, far infrared radiation, electron beam irradiation, and radiation exposure).

The alignment control film is formed through the above-mentioned four processes. However, the present invention is not limited to the order of the above-mentioned processes (1) to (4). Moreover, further effects are expected in the case of the following processes (a) and (b).

(a) The above-mentioned processes (3) and (4) are so processed as to temporally overlap with each other to accelerate the liquid crystal alignment capability impartation and induce the cross-linking reaction or the like. As a result, the alignment control film can be further effectively formed.

(b) In the case of using the heating, the infrared radiation, and the far infrared radiation of the above-mentioned process (4), the above-mentioned processes (2), (3), and (4) are allowed to temporally overlap with each other. As a result, the above-mentioned process (4) can also function as the imidization process of the above-mentioned process (2), and hence the alignment control film can be formed in a short time.

Next, a specific manufacturing method of this example is described. A glass substrate having a thickness of 0.7 mm whose surface has been polished is used as the glass substrate 101 forming the active matrix substrate and the glass substrate 102 forming the color filter substrate. The thin film transistor 115 formed on the glass substrate 101 includes the pixel electrode (source electrode) 105, the signal line (drain electrode) 106, the scanning line (gate electrode) 104, and the amorphous silicon 116.

All of the scanning lines 104, the common electrode line 120, the signal line 106, and the pixel electrode 105 were formed by patterning a chrome film, and an interval between the pixel electrode 105 and the common electrode 103 was set to 7 μm. The common electrodes 103 and the pixel electrode 105 were formed by using the chrome film which is low in resistance and easy in patterning. Alternatively, a transparent electrode may be formed by using an ITO film to achieve the higher brightness characteristic.

The gate insulating film 107 and the protective insulating film 108 were made of silicon nitride, and the respective thicknesses were set to 0.3 μm. An acrylic resin was coated on those films, and a heat treatment at 220° C. for 1 hour was conducted to form the transparent and insulating organic protective film 112.

Then, the through-hole 118 was formed up to the common electrode line 120 through the photolithography and etching process as illustrated in FIG. 2C, and the common electrodes 103 that connect to the common electrode line 120 were formed by patterning.

As a result, as illustrated in FIG. 2A, the pixel electrode 105 was arranged among the three common electrodes 103 within the unit pixel (one pixel) to form the active matrix substrate which has 1024×3×768 pixels, which includes 1024×3 (corresponding to R, G, and B) signal lines 106 and 768 scanning lines 104.

In this example, various polyamide acids 1 to 5 synthesized in accordance with the raw material compositions shown in Table 1 below were used for the alignment control film 109.

Then, those alignment control films were used to manufacture five liquid crystal display devices. The polyamide acid was used to prepare a varnish with a resin concentration of 5 wt %, DMAC of 60 wt %, γ-butyrolactone of 20 wt %, and butyl cellosolve of 15 wt %. The varnish was printed on an active matrix substrate, and imidized through a heat treatment, to thereby form a dense alignment control film 109 made of a polyimide and a polyamide acid with an imidization ratio of about 80% and a thickness of about 110 nm.

TABLE 1

| Alignment control film No. | Diamine compound Compound group A (Mol %) | Tetracarboxylic acid dianhydride | | |
|---|---|---|---|---|
| | | Compound group B (Mol %) | $R^1$ | n |
| 1-1 | A-1 (100) | B-1 (100) | —H | — |
| 1-2 | A-12 (100) | B-5 (100) | —CH$_3$ | — |
| 1-3 | A-19 (100) | B-8 (100) | —CH$_3$ | — |
| 1-4 | A-21 (100) | B-17 (100) | — | — |
| 1-5 | A-41 (100) | B-18 (100) | — | — |

Likewise, the same polyamide acid amide varnish was also printed on the surface of the other glass substrate 102 on which the ITO had been formed, to thereby form the dense alignment control film 109 made of a polyimide and a polyamide acid with the imidization ratio of about 80% and the thickness of about 110 nm. In order to impart the liquid crystal alignment capability to the surface of the alignment control film 109, polarized ultraviolet (UV) rays were applied onto the alignment control film 109. With the use of a high-pressure mercury lamp as the light source, the UV rays in a range of 240 nm to 320 nm were extracted through an interference filter. The extracted UV rays were linearly polarized at the polarization ratio of about 10:1 by using a pile polarizer in which quartz substrates were laminated on each other, and applied with the irradiation energy of 1.5 J/cm². As a result, it was found that the alignment direction of the liquid crystal molecules on the alignment control film surface was orthogonal to the polarization direction of the irradiated polarized UV rays.

Then, those two glass substrates 101 and 102 were faced each other at the surfaces having the respective alignment control films 109 with the liquid crystal alignment capability. Spacers formed of dispersed spherical polymer beads were interposed between those two glass substrates 101 and 102, and a sealing material was coated on the peripheral portions of the glass substrates 101 and 102, to thereby assemble a liquid crystal display panel (hereinafter, also referred to as "cell") forming the liquid crystal display device. The liquid crystal alignment directions of the two glass substrates 101 and 102 were substantially parallel to each other. A nematic liquid crystal composition A which was positive in the dielectric anisotropy Δ∈, 10.2 (1 kHz, 20° C.) in the value of the dielectric anisotropy, 0.075 (wavelength 590 nm, 20° C.) in the refractive anisotropy Δn, 7.0 pN in twisted elastic constant K2, and about 76° C. in nematic-to-isotropic transition temperature T (N−I) was injected into the cell in a vacuum, and sealed with a sealing material made of an ultraviolet curable resin. A liquid crystal panel in which the thickness (gap) of the liquid crystal layer was 4.2 μm was manufactured.

The retardation (Δn·d) of this liquid crystal display panel is about 0.31 μm. It is desired that Δn·d satisfy a range of 0.2 μm≤Δn·d≤0.5 μm, and when Δn·d exceeds this range, there arises such a problem that white display is colored. Further, a liquid crystal display panel of a homogeneous alignment was manufactured by using the same alignment control film and the liquid crystal composition as those used in this panel, and the pretilt angle of liquid crystal was measured through a crystal rotation method. The measurement result was about 0.2 degrees. This liquid crystal display panel was sandwiched between the two polarization plates 114 so that the polarization transmission axis of one polarization plate was so arranged to be substantially parallel to the above-mentioned liquid crystal alignment direction, and the polarization transmission axis of the other polarization plate was so arranged to be orthogonal to the former polarization transmission axis. After that, a drive circuit, a backlight, and the like were connected for modulation to obtain the active matrix liquid crystal display device. In this example, a normally close characteristic in which dark display was established with a low voltage, and bright display was established with a high voltage was provided.

As a result of evaluating the display quality of the five liquid crystal display devices according to this example, a wide viewing angle at the time of the halftone display was confirmed as well as the high-grade display of 500:1 in the contrast ratio. The contrast ratios of the liquid crystal display devices using diamine compounds (A-1), (A-19), and (A-21) exceed 600:1, which exhibit particularly satisfactory display quality.

Further, in order to quantitatively measure the image-sticking and the residual image of the five liquid crystal display devices according to this example, an oscilloscope having the combination of photodiodes was used for evaluation. First, a window pattern was displayed on a screen with the maximum brightness for 10 hours. After that, the entire screen was switched to the halftone display where the residual image was most visible, that is, in this example, the brightness of 10% of the maximum brightness. The display quality was evaluated with a time until the pattern of an edge portion of the window pattern was eliminated as a residual image relaxation time. However, the residual image relaxation time permitted in this example is 5 minutes or less. As a result, the residual image relaxation time was 5 minutes or less in the use temperature range (0° C. to 50° C.). Even in the visual image quality residual image test, the sticking of the image and the display unevenness caused by the residual image were not found at all. Therefore, the high display characteristic was obtained.

Comparative Example 1

Similar liquid crystal display devices were produced using a tetracarboxylic acid dianhydride that is a material as a tetracarboxylic acid dianhydride derivative in the alignment control films 1 to 5. As a result, an irradiation energy of 6 J/cm² or more was required for exhibiting the display properties equal to those in Example 1.

Example 2

Figure 3:
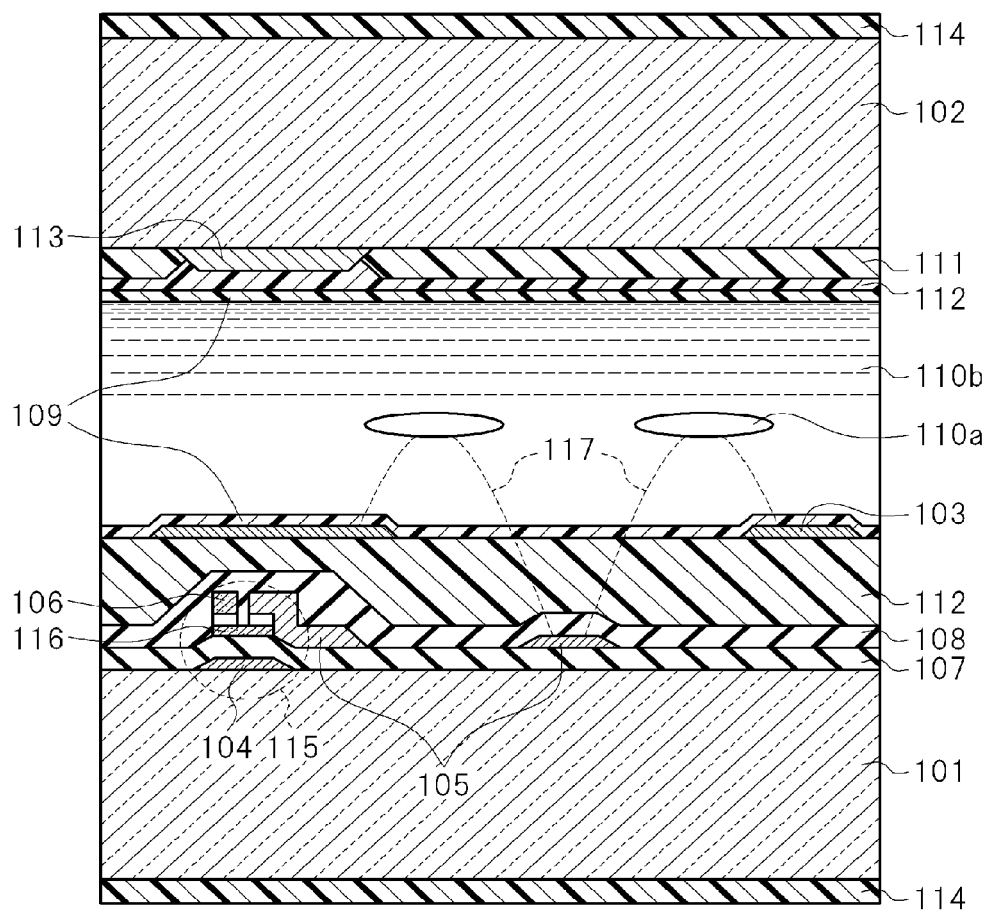
FIG. 3 is a schematic cross-sectional view in the vicinity of one pixel of a liquid crystal display device according to Example 2.
Figure 4A:
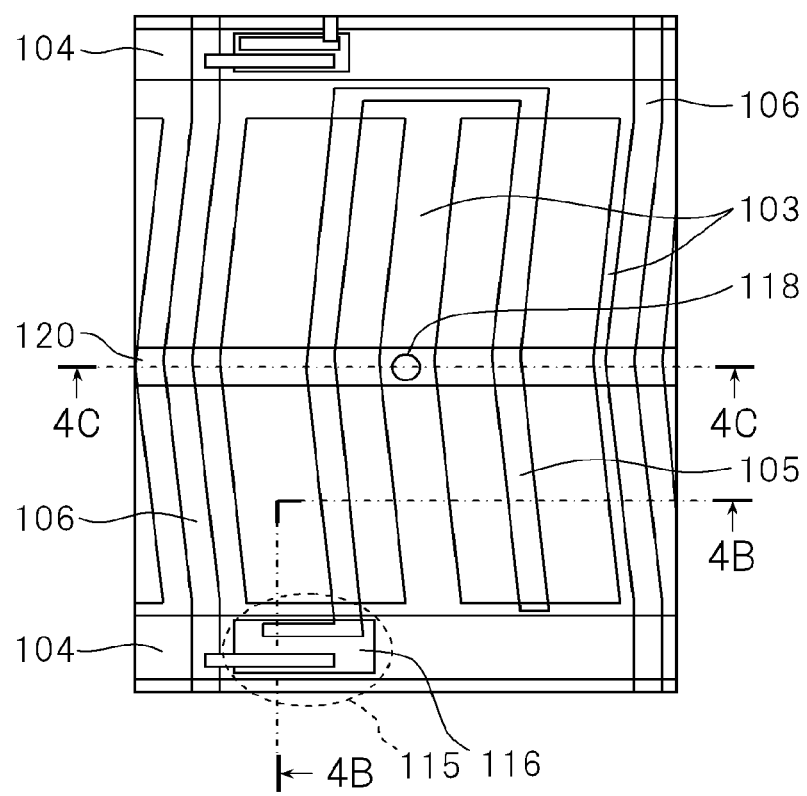
FIG. 4A is a schematic plan view of an active matrix substrate illustrating a configuration in the vicinity of one pixel of the liquid crystal display device according to Example 2.
Figure 4B:
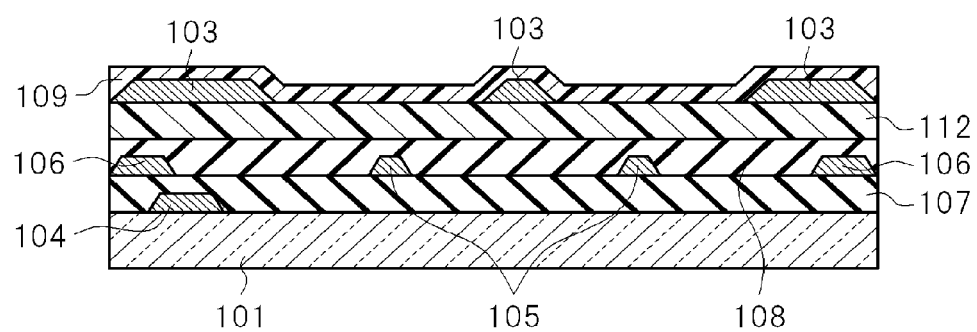
FIG. 4B is a cross-sectional view taken along the line 4B of FIG. 4A.
Figure 4C:
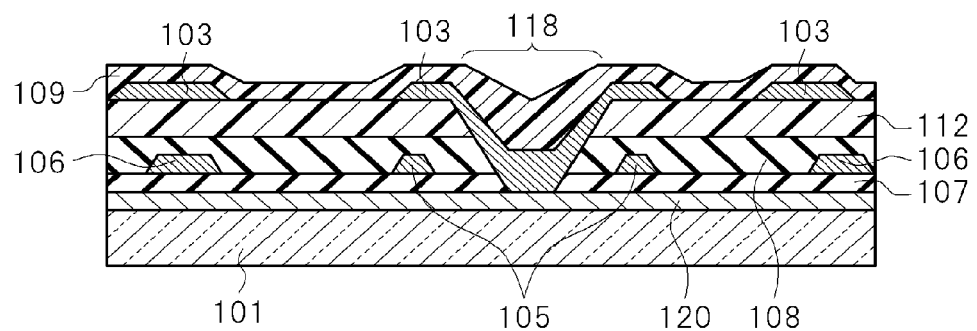
FIG. 4C is a cross-sectional view taken along the line 4C of FIG. 4A.

FIG. 3 is a schematic cross-sectional view illustrating a vicinity of one pixel in the liquid crystal display device according to Example 2. FIG. 4A is a schematic plan view of an active matrix substrate illustrating the configuration of the vicinity of one pixel of the liquid crystal display device according to Example 2. FIG. 4B is a cross-sectional view taken along the line 4B illustrated in FIG. 4A. FIG. 4C is a cross-sectional view taken along the line 4C illustrated in FIG. 4A.

Further, FIG. 4 is a schematic view of an active matrix substrate illustrating a configuration in the vicinity of one pixel of the liquid crystal display device according to this example. FIG. 4A is a plan view, FIG. 4B is a cross-sectional view taken along the line 4B of FIG. 4A, and FIG. 4C is a cross-sectional view taken along the line 4C of FIG. 4A. Further, FIG. 3 corresponds to a part of the cross-section taken along the line 4B of FIG. 4A.

FIGS. 4B and 4C emphasize and schematically illustrate configurations of main portions, and do not correspond one by one to cut portions of the line 4B and the line 4C of FIG. 4A. For example, the semiconductor film 116 is not illustrated in FIG. 4B.

In this example, the gate electrodes 104 and the common electrode line 120 which are made of Cr are arranged on the glass substrate 101 forming the active matrix substrate, and the gate insulating film 107 made of silicon nitride is so formed as to cover the gate electrodes 104 and the common electrode line 120. Further, the semiconductor film 116 made of amorphous silicon or polysilicon is arranged above each of the gate electrodes 104 through the gate insulating film 107, and functions as an active layer of each thin film transistor 115 serving as the active element.

Further, each drain electrode 106 and each source electrode (pixel electrode) 105 made of chrome/molybdenum are so arranged as to be superimposed on a part of the pattern of the semiconductor film 116, and the protective insulating film 108 made of silicon nitride is so formed as to cover all of those components. The organic protective film 112 is arranged on the protective insulating film 108. The organic protective film 112 is made of, for example, a transparent material such as an acrylic resin. Further, the pixel electrode 105 is formed of a transparent electrode made of ITO ($In_2O_3$:Sn) or the like. The common electrode 103 is connected to the common electrode line 120 through the through-hole 118 that passes through the gate insulating film 107, the protective insulating film 108, and the organic protective film 112.

In the case of applying an electric field for driving the liquid crystal, the common electrode 103 paired with the pixel electrode 105 is so formed as to surround the region of one pixel in a planar fashion. Further, the common electrode 103 is arranged on the organic protective film 112. The common electrode 103 is so arranged as to cover the drain electrode 106, the scanning lines 104, and the thin film transistor 115 which is an active element, which are disposed below when being viewed from the top. The common electrode 103 also functions as a light shield layer that shields light from the semiconductor film 116.

The alignment control film 109 is formed on the surface of the glass substrate 101 forming the active matrix substrate in which the unit pixels (one pixel) configured as described above are arranged in matrix, that is, on the organic protective film 112 and the common electrode 103 formed on the organic protective film 112. On the other hand, on the glass substrate 102 forming the counter substrate, the alignment control film 109 is formed on the organic protective film 112 formed on the color filter layer 111.

Here, like Example 1, the liquid crystal alignment capability is imparted to the alignment control film 109 by irradiation of linearly polarized ultraviolet rays which are extracted with the use of a pile polarizer in which quartz plates are laminated on each other with a high-pressure mercury lamp as a light source.

The glass substrate 101 and the counter glass substrate 102 are arranged to face each other at the surfaces where the alignment control films 109 are formed, and the liquid crystal composition layer 110b made of liquid crystal molecules 110a are arranged between the glass substrate 101 and the counter glass substrate 102. Further, on the respective outer surfaces of the glass substrate 101 and the counter glass substrate 102, the polarization plates 114 are formed.

As described above, also in this example, like Example 1 above, the pixel electrode 105 is arranged below the organic protective film 112 and the protective insulating film 108, and the common electrode 103 is arranged above the pixel electrode 105 and the organic protective film 112. Further, when the electric resistance of the common electrode 103 is sufficiently low, the common electrode 103 can also function as the common electrode line 120 formed in the lowest layer. In this case, the formation of the common electrode line 120 disposed in the lowest layer and the processing of the through-hole 118 accompanied by the formation of the common electrode line 120 can be omitted.

In this example, as illustrated in FIG. 4A, one pixel is configured by a region surrounded by the common electrodes 103 formed in a lattice, and one pixel is divided into four regions together with the pixel electrode 105. Further, the pixel electrode 105 and the common electrodes 103 that face the pixel electrode 105 are of a zigzag bent structure where those components are arranged in parallel to each other. One pixel forms a plurality of sub-pixels of two or more. With this structure, a change in color tone within the plane is offset.

Next, a manufacturing method for the liquid crystal display device according to this example is described. A glass substrate having a thickness of 0.7 mm whose surface has been polished is used as the glass substrate 101 and the glass substrate 102. The thin film transistor 115 includes the pixel electrode (source electrode) 105, the signal line (drain electrode) 106, the scanning line (gate electrode) 104, and the amorphous silicon 116. The scanning line 104 was formed by patterning an aluminum film, the common electrode line 120 and the signal line 106 were formed by patterning a chrome film, and the pixel electrode 105 was formed by patterning an ITO film. As illustrated in FIG. 4A, the components other than the scanning line 104 were formed into electrode line patterns which were bent in zigzag. In this situation, an angle of bending was set to 10 degrees. The gate insulating film 107 and the protective insulating film 108 were made of silicon nitride, and the respective thicknesses were set to 0.3 µm. Then, as illustrated in FIG. 4C, the through-hole 118 having a diameter of about 10 µm was formed into a cylindrical shape through the photolithography method and the etching process so as to extend up to the common electrode line 120. An acrylic resin was coated on the through-hole 118, and a heat treatment was performed at 220° C. for 1 hour to form the transparent and insulating organic protective film 112 which was about 4 in dielectric constant at a thickness of about 1 µm. The roughness caused by a step of the pixel electrode 105 in the display region was flattened by the organic protective film 112. Further, the roughness caused by a step at a boundary portion of the color filter layer 111 between the adjacent pixels was flattened by the organic protective film 112.

After that, the through-hole 118 was again etched to have a diameter of about 7 µm, and the common electrode 103 connected to the common electrode line 120 was formed on the through-hole 118 by patterning an ITO film. In this situation, the interval between the pixel electrode 105 and the common electrode 103 was set to 7 µm. Further, the common electrode 103 was formed in a lattice so as to cover the upper portions of the signal line 106, the scanning lines 104, and the thin film transistor 115, and to surround the pixel, and also was formed so as to function as the light shield layer.

As a result, within the unit pixel, as illustrated in FIG. 4A, the pixel electrode 105 was arranged among the three common electrodes 103 to obtain the active matrix substrate which had 1024×3×768 pixels, including 1024×3 (corresponding to R, G, and B) signal lines 106 and 768 scanning lines 104.

In this example, various polyamide acid t-butyl esters 1 to 3 synthesized in accordance with the raw material compositions shown in Table 2 below were used for the alignment control film 109. Then, those alignment control films were used to manufacture three liquid crystal display devices. The polyamide acid t-butyl ester was used to prepare a varnish with a resin concentration of 5 wt %, DMAC of 60 wt %, γ-butyrolactone of 20 wt %, and butyl cellosolve of 15 wt %. The varnish was printed on an active matrix substrate, and imidized through a heat treatment to form a dense alignment control film 109 made of a polyimide and a polyamide acid t-butyl ester with an imidization ratio of about 90% and a thickness of about 120 nm.

TABLE 2

| Alignment control film No. | Diamine compound Compound group A (Mol %) | Compound group B (Mol %) | Tetracarboxylic acid dianhydride $R^1$ | n |
|---|---|---|---|---|
| 2-1 | A-1 (80) | B-3 (70) | —$CH_3$ | — |
|  | A-27 (20) | B-16 (30) | — | — |
| 2-2 | A-12 (90) | B-4 (60) | —$CH_2CH_2CH_3$ | — |
|  | A-42 (10) | B-18 (40) | — | — |
| 2-3 | A-19 (60) | B-9 (50) | — | — |
|  | A-20 (40) | B-6 (50) | —$CH_2CH_3$ | — |

In the aligning method, the same polarized UV as that in Example 1 was applied with the irradiation energy of 1.5 J/cm$^2$.

Then, those two glass substrates 101 and 102 are faced each other at the surfaces having the alignment control films. Spacers formed of dispersed spherical polymer beads were interposed between those glass substrates, and a sealing material was coated on the peripheral portions of the glass substrates to assemble a liquid crystal display panel. The liquid crystal alignment directions of those two glass substrates 101 and 102 were substantially parallel to each other.

A nematic liquid crystal composition A which was positive in the dielectric anisotropy Δ∈, 10.2 (1 kHz, 20° C.) in the value of the dielectric anisotropy, 0.075 (wavelength 590 nm, 20° C.) in the refractive anisotropy Δn, 7.0 pN in twisted elastic constant K2, and about 76° C. in nematic-to-isotropic transition temperature T (N−1) was injected into the liquid crystal display panel in a vacuum, and sealed with a sealing material made of an ultraviolet curable resin. A liquid crystal panel in which a thickness (gap) of the liquid crystal layer was 4.2 μm was manufactured. The retardation (Δnd) of this panel is about 0.31 μm.

Further, a liquid crystal display panel of a homogeneous alignment was manufactured by using the same alignment control film and liquid crystal composition as those used in the liquid crystal display panel, and the pretilt angle of liquid crystal was measured through a crystal rotation method. The measurement result was about 0.2 degrees. This liquid crystal display panel was sandwiched between the two polarization plates 114 so that the polarization transmission axis of one polarization plate was so arranged to be substantially parallel to the above-mentioned liquid crystal alignment direction, and the polarization transmission axis of the other polarization plate was so arranged to be orthogonal to the former polarization transmission axis. After that, a drive circuit, a backlight, and the like were connected for modulation to obtain the active matrix liquid crystal display device. In this example, a normally close characteristic in which dark display is established with a low voltage, and bright display is established with a high voltage was provided.

Next, as a result of evaluating the display quality of the three liquid crystal display devices according to this example, the aperture ratio was higher than that in the liquid crystal display device of Example 1, and a wide viewing angle at the time of the halftone display was confirmed as well as the high-grade display of 500:1 in the contrast ratio. The contrast ratios of the liquid crystal display devices containing 60 mol % or more of the diamine compounds (A-1) and (A-19) exceed 600:1, which exhibit particularly satisfactory display quality. Further, as a result of quantitatively evaluating the image-sticking and the residual image relaxation time of the liquid crystal display devices as in Example 1, the residual image relaxation time was 5 minutes or less in the use temperature range of 0° C. to 50° C., and even in the visual image quality residual image test, the sticking of the image, and the display unevenness caused by the residual image were not found at all, and the high display characteristic equivalent to Example 1 was obtained.

Example 3

Figure 5:
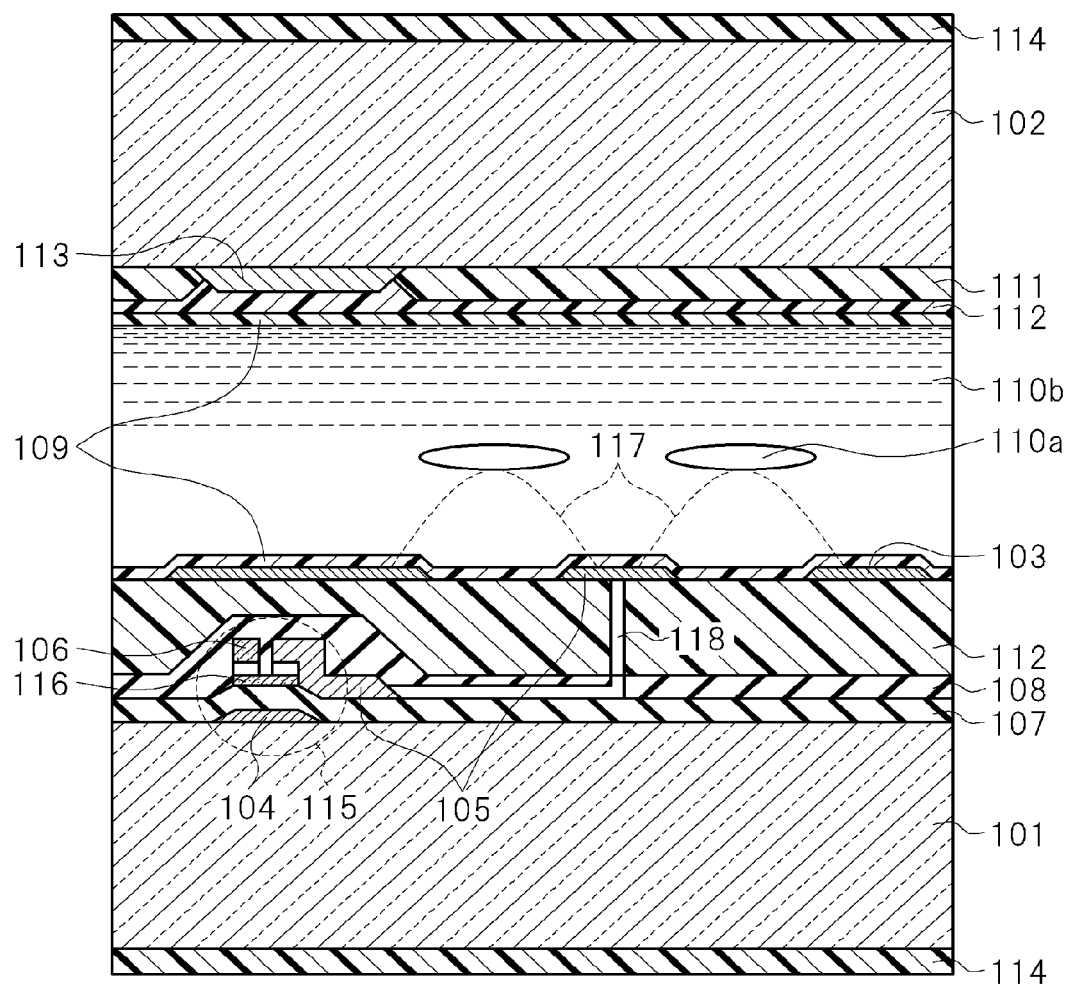
FIG. 5 is a schematic cross-sectional view in the vicinity of one pixel of a liquid crystal display device according to Example 3.

FIG. 5 is a schematic cross-sectional view of the vicinity of one pixel in a liquid crystal display device according to Example 3. In the figure, the same symbols as those in the figures of the respective examples correspond to identical function portions. As illustrated in FIG. 5, in this example, the pixel electrode 105 disposed below the protective insulating film 108 is pulled up onto the organic protective film 112 through the through-hole 118 so as to be arranged in the same layer as that of the common electrode 103. In this configuration, a voltage for driving the liquid crystal can be further reduced.

In the TFT liquid crystal display device configured as described above, at the time of applying no electric field, the liquid crystal molecules 110a forming the liquid crystal composition layer 110b are aligned substantially in parallel to the surfaces of the glass substrates 101 and 102 which face each other. The liquid crystal molecules 110a are homogeneously aligned in a state in which the liquid crystal molecules 110a are directed in an initial alignment direction regulated by the photo-alignment process. In this example, when a voltage is applied to the gate electrodes 104 to turn on the thin film transistor 115, an electric field 117 is applied to the liquid crystal composition layer 110b due to a potential difference between the pixel electrode 105 and the common electrode 103. The liquid crystal molecules 110a turn to the electric field direction due to an interaction of a dielectric anisotropy of the liquid crystal composition and the electric field. In this situation, the dielectric anisotropy of the liquid crystal composition layer 110b and the action of the polarization plates 114 can change the light transmittance of the liquid crystal display device for display.

Hereinafter, a method of manufacturing the liquid crystal display device according to this example is described. As the glass substrates 101 and 102, glass substrates each having a thickness of 0.7 mm whose surfaces have been polished are used. The thin film transistor 115 includes the pixel electrode (source electrode) 105, the signal line (drain electrode) 106, the scanning line (gate electrode) 104, and the amorphous silicon 116. The scanning lines 104 were formed by patterning an aluminum film. The common electrode line 120, the signal line 106, and the pixel electrode 105 were formed by patterning a chrome film. The gate insulating film 107 and the protective insulating film 108 were made of silicon nitride, and the respective thicknesses were set to 0.3 μm. An acrylic resin was coated on those films, and a heat treatment was performed at 220° C. for 1 hour to form the transparent and insulating organic protective film 112 which was about 4 in the dielectric constant at a thickness of about 1.0 μm. The roughness caused by a step of the pixel electrode 105 in the display region was flattened by the organic protective film 112. Further, the roughness caused by a step between the adjacent pixels was flattened by the organic protective film 112.

Then, as illustrated in FIG. 5, the through-hole 118 having a diameter of about 10 μm was formed into a cylindrical shape through the photolithography method and the etching process so as to extend up to the source electrode 105. The pixel electrode 105, which was connected to the source electrode 105, was formed by patterning an ITO film on the upper portion of the through-hole 118. Further, in the common electrode line 120, a through-hole was formed into a cylindrical shape with a diameter of about 10 μm, and an ITO film was patterned on the upper portion of the through-hole to form the common electrode 103. In this situation, the interval between the pixel electrode 105 and the common electrode 103 was set to 7 μm, and the components other than the scanning lines 104 were formed into electrode line patterns which were bent in zigzag. In this situation, an angle of bending was set to 10 degrees. Further, the common electrodes 103 were formed in a lattice so as to cover the upper portions of the signal line 106, the scanning lines 104, and the thin film transistor 115, and to surround the pixels. Thus, the common electrode 103 also functions as the light shield layer.

As a result, except that two kinds of through-holes were formed within the unit pixel, the pixel electrode 105 was arranged among the three common electrodes 103 substantially in the same manner as that of Example 2. With this configuration, the active matrix substrate which had 1024× 3×768 pixels, including of 1024×3 (corresponding to R, G, and B) signal lines 106 and 768 scanning lines 104 was formed.

As described above, the liquid crystal display device was manufactured in the same manner as that of Example 2 as illustrated in FIG. 5, except for the pixel configuration and the alignment control film to be used.

In this example, various polyamide acid ethyl esters 1 to 3 synthesized in accordance with the raw material compositions shown in Table 3 below were used for the alignment control film 109. Then, those alignment control films were used to manufacture three liquid crystal display devices. The polyamide acid ethyl ester was used to prepare a varnish with a resin concentration of 5 wt %, DMAC of 60 wt %, γ-butyrolactone of 20 wt %, and butyl cellosolve of 15 wt %. The varnish was printed on an active matrix substrate, and imidized through a heat treatment to form a dense alignment control film 109 made of a polyimide and a polyamide acid ethyl ester with an imidization ratio of about 80% and a thickness of about 140 nm.

TABLE 3

| Alignment control film No. | Diamine compound Compound group A (Mol %) | Tetracarboxylic acid dianhydride | | |
|---|---|---|---|---|
| | | Compound group B (Mol %) | $R^1$ | n |
| 3-1 | A-47 (70) A-60 (20) A-49 (10) | B-3 (100) | —CH$_3$ | — |
| 3-2 | A-58 (60) A-44 (20) A-33 (20) | B-1 (80) B-5 (20) | —C(CH$_3$)$_3$ H | — |

TABLE 3-continued

| Alignment control film No. | Diamine compound Compound group A (Mol %) | Tetracarboxylic acid dianhydride | | |
|---|---|---|---|---|
| | | Compound group B (Mol %) | $R^1$ | n |
| 3-3 | A-26 (40) A-37 (40) A-23 (20) | B-7 (50) B-10 (10) B-12 (40) | —CH$_3$ — —CH$_2$CH$_3$ | — — — |

In the aligning method, the same polarized UV as that in Example 1 was applied with the irradiation energy of 1.5 J/cm$^2$.

Then, as a result of evaluating the display quality of the three liquid crystal display devices according to this example, a wide viewing angle at the time of the halftone display was confirmed as well as the high-grade display equivalent to that of the liquid crystal display devices of Example 1. Further, as a result of quantitatively evaluating the image-sticking and the residual image relaxation time of the liquid crystal display devices according to this example as in Example 1, the residual image relaxation time was about 5 minutes or less, and even in the visual image quality residual image test, the sticking of the image and the display unevenness caused by the residual image were not found at all, and the high display characteristic was obtained.

As illustrated in FIG. 5, in the case where the pixel electrode 105 connected directly to the TFT 115 is formed on the uppermost surface of the substrate, and the thin alignment control film 109 is formed on the pixel electrode 105, when a normal rubbing alignment processing is performed, electrostatic charge is generated due to rubbing, with the result that the TFT 115 may be damaged through the pixel electrode in the vicinity of the surface. In this case, the rubbingless photo-alignment process as in this example is very effective.

Example 4

Figure 6:
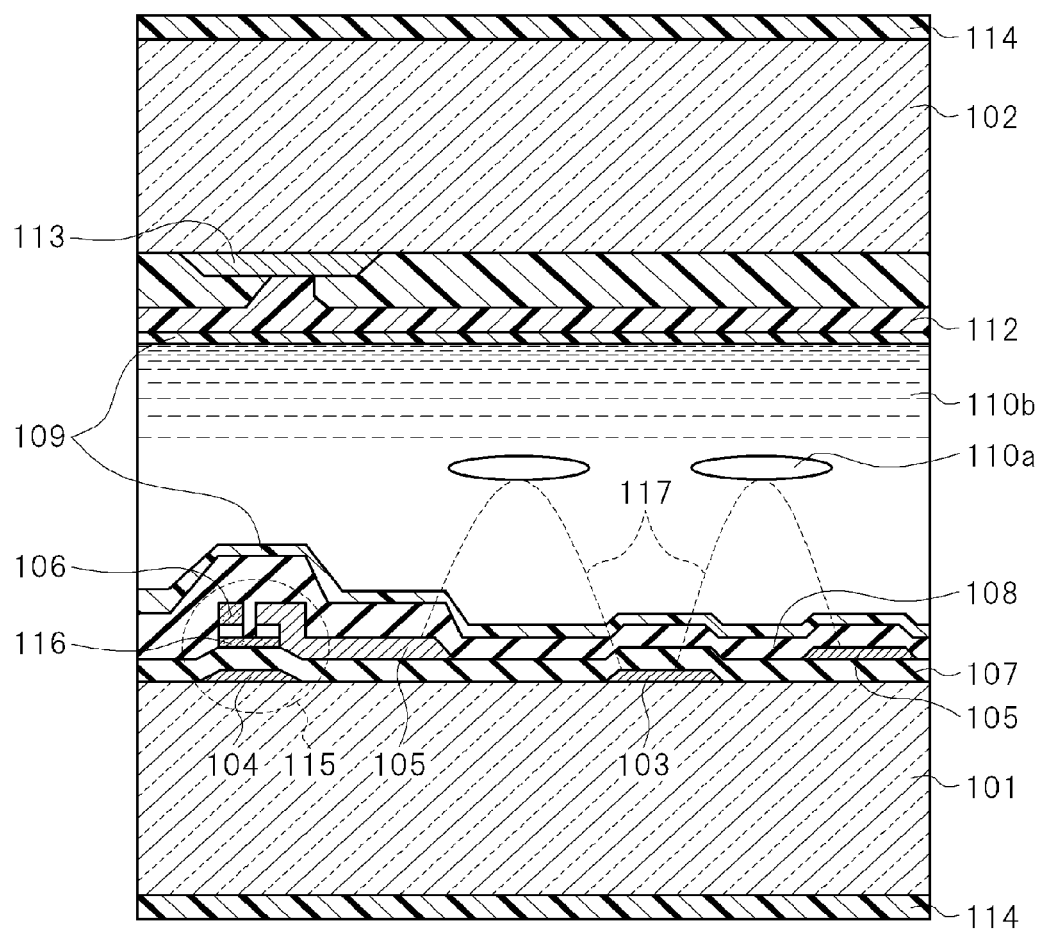
FIG. 6 is a schematic cross-sectional view in the vicinity of one pixel of a liquid crystal display device according to Example 4.

FIG. 6 is a schematic cross-sectional view of the vicinity of one pixel in a liquid crystal display device according to Example 4. In the figure, the same symbols as those in the figures of the respective examples correspond to identical function portions. This example employs a configuration in which a step due to electrodes and the like is large. In FIG. 6, the gate electrode 104 of each of thin film transistor 115 and the common electrode 103 are formed in the same layer, and the liquid crystal molecules 110a turn to the electric field direction due to the electric field 117 caused by the common electrode 103 and the pixel electrode 105.

Further, in the above-mentioned respective examples, a plurality of display regions, each of which is made up of the common electrode 103 and the pixel electrode 105, can be provided in one pixel. When the plurality of display regions are provided in this manner, even if one pixel is larger, a distance between the pixel electrode 105 and the common electrode 103 can be shortened. Therefore, a voltage to be applied for driving the liquid crystal can be decreased.

Further, in the above-mentioned respective examples, a material of the transparent conductive film forming at least one of the pixel electrode and the common electrode is not particularly restricted. However, taking the ease of processing and high reliability into consideration, it is desired to use a transparent conductive film of indium tin oxide (ITO) or any other ion-doped titanium oxide or ion-doped zinc oxide.

In the method of manufacturing the liquid crystal display device according to this example, glass substrates each having a thickness of 0.7 mm whose surfaces have been polished are used as the glass substrates 101 and 102. The thin film transistor 115 includes the pixel electrode (source electrode) 105, the signal line (drain electrode) 106, the scanning line (gate electrode) 104, and the amorphous silicon 116. All of the scanning line 104, the common electrode line 120, the signal line 106, the pixel electrode 105, and the common electrode 103 were formed by patterning a chrome film, and an interval between the pixel electrode 105 and the common electrodes 103 was set to 7 µm. The gate insulating film 107 and the protective insulating film 108 were made of silicon nitride, and the respective thicknesses were set to 0.3 µm.

In this example, various polyamide acids 1 to 5 synthesized in accordance with the raw material compositions shown in Table 4 below were used for the alignment control film 109. Then, those alignment control films were used to manufacture five liquid crystal display devices. The polyamide acid was used to prepare a varnish with a resin concentration of 5 wt %, DMAC of 60 wt %, γ-butyrolactone of 20 wt %, and butyl cellosolve of 15 wt %. The varnish was printed on an active matrix substrate, and imidized through a heat treatment to form a dense alignment control film 109 made of a polyimide and a polyamide acid with an imidization ratio of about 80% and a thickness of about 110 nm.

TABLE 4

| Alignment control film No. | Diamine compound Compound group A (Mol %) | Tetracarboxylic acid dianhydride | | |
|---|---|---|---|---|
| | | Compound group B (Mol %) | $R^1$ | n |
| 4-1 | A-64 (100) | B-11 (50) | —CH₃ | — |
| | | B-17 (50) | — | — |
| 4-2 | A-53 (100) | B-14 (70) | —H | 1 |
| | | B-14 (30) | —CH₃ | 2 |
| 4-3 | A-22 (100) | B-16 (10) | —CH₃ | — |
| | | B-18 (10) | — | — |
| | | B-8 (80) | H | — |

In the aligning method, the same polarized UV as that in Example 1 was applied with the irradiation energy of 1.5 J/cm². As a result, the active matrix substrate which had 1024×3×768 pixels, including 1024×3 (corresponding to R, G, and B) signal lines 106 and 768 scanning lines 104, was formed.

As described above, the liquid crystal display device according to this example illustrated in FIG. 6 was manufactured in the same manner as that of Example 1 except for the pixel structure.

Next, as a result of evaluating the display quality of three liquid crystal display devices according to this example, a wide viewing angle at the time of the halftone display was confirmed as well as the high-grade display equivalent to that of the liquid crystal display device of Example 1. The contrast ratio of the liquid crystal display devices using the diamine compounds (A-22) and (A-53) exceeded 600:1, which exhibited a particularly satisfactory display quality. Further, as a result of quantitatively evaluating the image-sticking and the residual image relaxation time of the liquid crystal display devices according to this example as in Example 1, the residual image relaxation time was 5 minutes or less, and even in the visual image quality residual image test, the sticking of the image, and the display unevenness caused by the residual image were not found at all, and the high display characteristic was obtained.

Example 5

Figure 7:
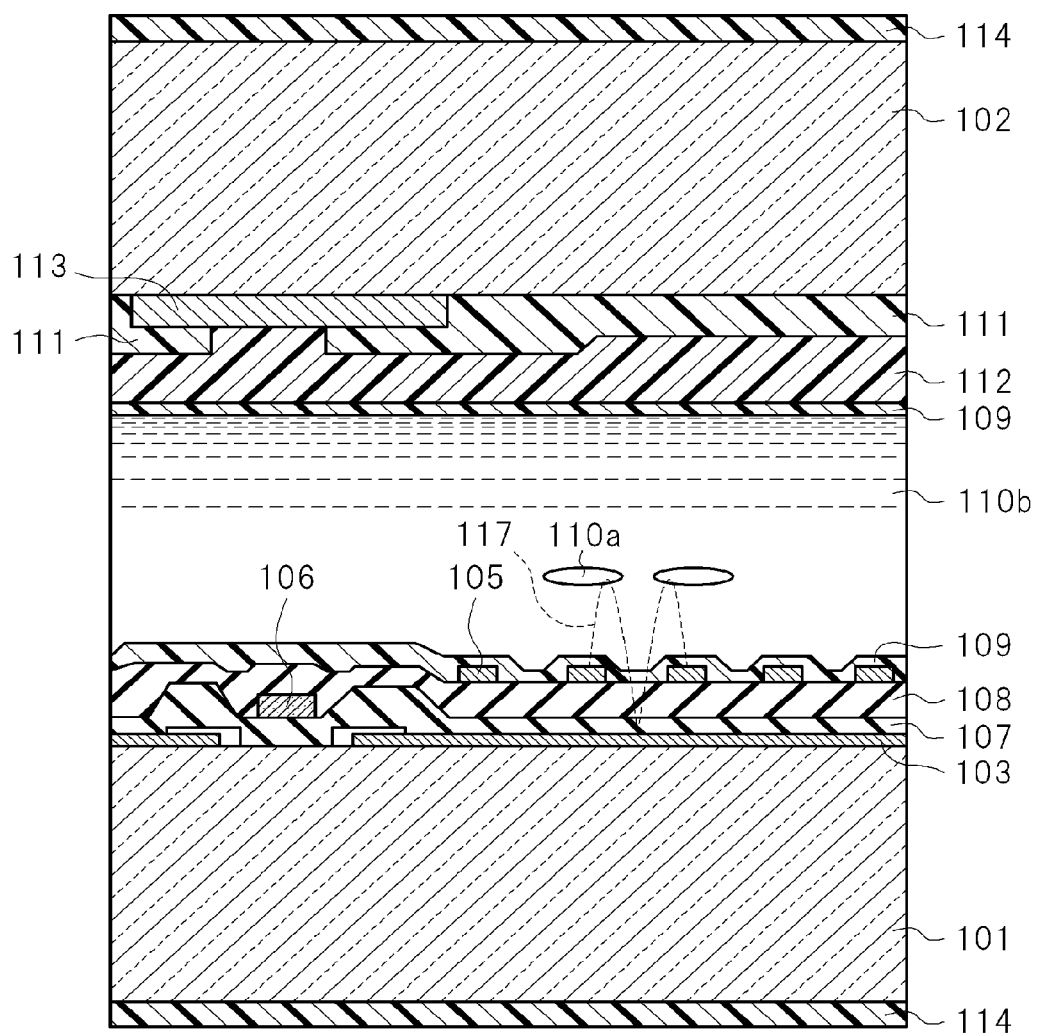
FIG. 7 is a schematic cross-sectional view in the vicinity of one pixel of a liquid crystal display device according to Example 5.

FIG. 7 is a schematic cross-sectional view of the vicinity of one pixel in a liquid crystal display device according to Example 5. In the figure, the same symbols as those in the figures of the respective examples correspond to identical function portions. In this example, the pixel electrode 105 and the common electrode 103 are made of ITO, and the common electrode 103 is formed of a solid electrode that covers the substantially entire pixel. With this configuration, the electrode can be also used as a transmission portion so that the aperture ratio can be improved. Further, the electrode interval can be shortened, and hence the electric field can be efficiently applied to the liquid crystal.

Figure 8:
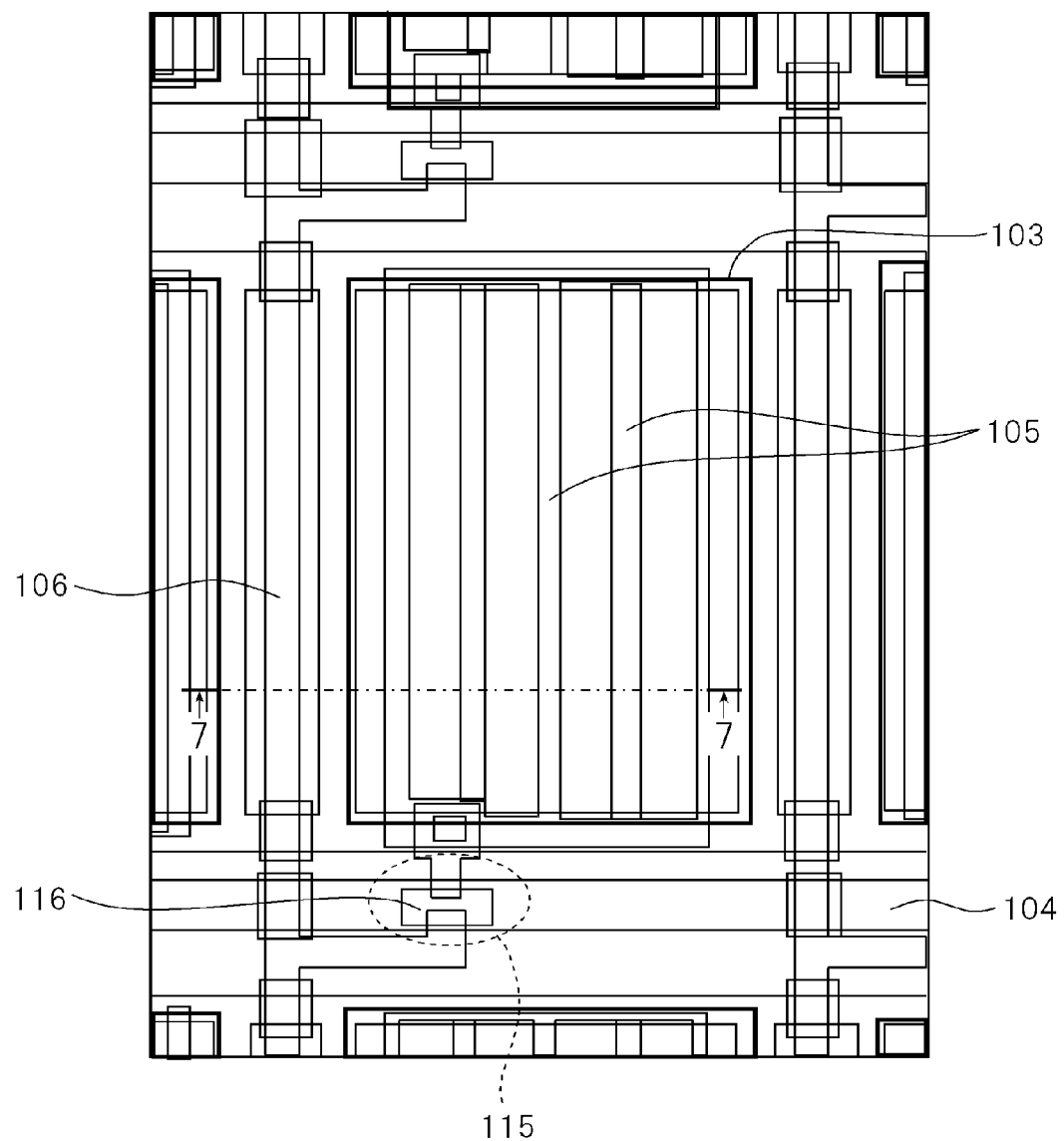
FIG. 8 is a schematic plan view of an active matrix substrate illustrating a configuration in the vicinity of one pixel of the liquid crystal display device according to Example 5.

FIG. 8 is a schematic plan view of an active matrix substrate illustrating the configuration of the vicinity of one pixel in the liquid crystal display device according to Example 5. FIG. 8 illustrates the structures of the thin film transistor 115, the common electrode 103, the pixel electrode 105, and the signal line 106.

In the method of manufacturing the liquid crystal display device according to this example, a glass substrate having a thickness of 0.7 mm whose surface has been polished is used as the glass substrate 101. On the glass substrate 101, the gate insulating film 107 for preventing the common electrode 103, the pixel electrode 105, the signal line 106, and the scanning lines 104 from being short-circuited, and the protective insulating film 108 for protecting the thin film transistor 115, the pixel electrode 105, and the signal line 106 are formed, to thereby provide a TFT substrate.

The thin film transistor 115 includes the pixel electrode (source electrode) 105, the signal line (drain electrode) 106, the scanning line (gate electrode) 104, and the amorphous silicon 116. The scanning line (gate electrode) 104 is formed by patterning an aluminum film, the signal line (drain electrode) 106 is formed by patterning a chrome film, and the common electrode 103 and the pixel electrode 105 are formed by patterning ITO.

The gate insulating film 107 and the protective insulating film 108 were made of silicon nitride, and the respective thicknesses were set to 0.2 µm and 0.3 µm. A capacitive element was formed as a structure in which the gate insulating film 107 and the protective insulating film 108 were sandwiched between the pixel electrode 105 and the common electrode 103.

The pixel electrode 105 is so arranged as to overlap with an upper layer of the common electrode 103 having a solid shape. The number of pixels is 1024×3×768, including 1024×3 (corresponding to R, G, and B) signal lines 106 and 768 scanning lines 104.

On the glass substrate 102, the color filter layer 111 with the black matrix 113 is formed, to thereby provide a counter color filter substrate as in Example 1.

In this example, various polyamide acid methyl esters 1 to 5 synthesized in accordance with the raw material compositions shown in Table 5 below were used for the alignment control film 109. Then, those alignment control films were used to manufacture five liquid crystal display devices. The polyamide acid methyl ester was used to prepare a varnish with a resin concentration of 5 wt %, DMAC of 60 wt %, γ-butyrolactone of 20 wt %, and butyl cellosolve of 15 wt %. The varnish was printed on an active matrix substrate, and imidized through a heat treatment to form a dense alignment control film 109 made of a polyimide and a polyamide acid methyl ester with an imidization ratio of about 70% and a thickness of about 130 nm.

TABLE 5

| Alignment control film No. | Diamine compound Compound group A (Mol %) | Tetracarboxylic acid dianhydride | | |
|---|---|---|---|---|
| | | Compound group B (Mol %) | $R^1$ | n |
| 5-1 | A-1 (100) | B-2 (100) | —$CH_3$ | — |
| 5-2 | A-1 (100) | B-2 (80) | —$CH_3$ | — |
| | | PMDA (20) | | |
| 5-3 | A-1 (100) | B-2 (70) | —$CH_3$ | — |
| | | PMDA (30) | | |
| 5-4 | A-1 (90) | B-6 (100) | —$CH_2CH_3$ | — |
| | A-29 (10) | | | |
| 5-5 | A-19 (100) | B-13 (20) | —H | 1 |
| | | B-15 (80) | — | — |

PMDA: Pyromellitic acid dianhydride

Likewise, the same polyamide acid ethyl ester varnish was also printed on the surface of the other glass substrate 102 on which an ITO film had been formed, and imidized through a heat treatment to form a dense alignment control film 109 made of a polyimide and a polyamide acid methyl ester with an imidization ratio of about 80% and a thickness of about 110 nm.

In the aligning method, the polarized UV was applied with the irradiation energy of 1.5 J/cm².

The alignment directions of the alignment control films 109 on the TFT substrate and the color filter substrate were substantially parallel to each other. Polymer beads having an average grain diameter of 4 μm were dispersed as spacers between the substrates, and the liquid crystal molecules 110a were sandwiched between the TFT substrate and the color filter substrate. The liquid crystal molecules 110a were made of the same liquid crystal composition A as that in Example 1.

The two polarization plates 114 that sandwich the TFT substrate and the color filter substrate were arranged in crossed nicols. A normally close characteristic in which dark display is established with a low voltage and bright display is established with a high voltage was adopted.

Next, as a result of evaluating the display quality of the liquid crystal display device according to this example, the aperture ratio was higher than that in the liquid crystal display device of Example 1, and a wide viewing angle at the time of the halftone display was confirmed as well as the high-grade display of 700:1 in the contrast ratio. Further, as a result of quantitatively evaluating the image-sticking and the residual image relaxation time of the liquid crystal display devices as in Example 1, the residual image relaxation time was 5 minutes or less in the use temperature range of 0° C. to 50° C., and even in the visual image quality residual image test, the sticking of the image, and the display unevenness caused by the residual image were not found at all, and the high display characteristic equivalent to Example 1 was obtained.

Example 6

In this example, the liquid crystal display device was manufactured in the same manner as that in Example 5 except that various polyamide acid methyl esters synthesized in accordance with the raw material compositions shown in Table 6 below were used as the alignment control film 109.

TABLE 6

| Alignment control film No. | Diamine compound Compound group A (Mol %) | Tetracarboxylic acid dianhydride | | |
|---|---|---|---|---|
| | | Compound groups B and C (Mol %) | $R^1$ | n |
| 6-1 | A-1 (100) | B-1 (70) | —$CH_3$ | — |
| | | C-2 (30) | — | — |
| 6-2 | A-1 (100) | B-2 (80) | —$CH_3$ | — |
| | | C-2 (20) | — | — |
| 6-3 | A-1 (100) | B-5 (70) | —$CH_3$ | — |
| | | C-5 (30) | — | — |
| 6-4 | A-1 (50) | B-15 (90) | — | — |
| | A-34 (50) | C-6 (10) | — | — |
| 6-5 | A-29 (40) | B-12 (90) | —$CH_2CH_3$ | — |
| | A-60 (60) | C-4 (10) | — | — |

Next, as a result of evaluating the display quality of the liquid crystal display device according to this example, the aperture ratio was higher than that in the liquid crystal display device of Example 1, and a wide viewing angle at the time of the halftone display was confirmed as well as the high-grade display of 800:1 in the contrast ratio. Further, as a result of quantitatively evaluating the image-sticking and the residual image relaxation time of the liquid crystal display devices as in Example 1, the residual image relaxation time was 2 minutes or less in the use temperature range of 0° C. to 50° C., and stability of alignment of the liquid crystal is higher than that of the other examples. Further, even in the visual image quality residual image test, the sticking of the image, and the display unevenness caused by the residual image were not found at all, and the high display characteristic equivalent to Example 1 was obtained.

While there have been described what are at present considered to be certain embodiments of the invention, it will be understood that various modifications may be made thereto, and it is intended that the appended claim cover all such modifications as fall within the true spirit and scope of the invention.

What is claimed is:

1. A liquid crystal display device, comprising:
a pair of substrates, at least one of which is transparent;
a liquid crystal layer placed between the pair of substrates;
an electrode group, formed on at least one of the pair of substrates, for applying an electric field to the liquid crystal layer; and
an alignment control film placed on at least one of the pair of substrates,
wherein the alignment control film is formed of polyimide and a precursor of the polyimide,
each of the polyimide and the precursor of the polyimide being obtained from a cyclobutanetetracarboxylic acid dianhydride derivative represented by the following chemical formula (I) and aromatic diamine as reactants, and
the alignment control film is provided with alignment capability by photo-alignment treatment:

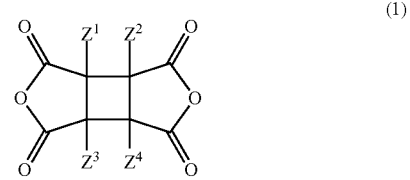

(1)

where at least one of $Z^1$ to $Z^4$ is a substituent represented by —$NR_2$, —SR, —OH, —C(=O)—R, —$(CH_2)_n$—COOR, —CN, or —$NO_2$ (R's each independently represent a hydrogen atom or an alkyl group having a carbon number of 1 to 4, and n represents an integer of 0 to 2), and the others are hydrogen atoms, wherein the aromatic diamine contains at least one kind of aromatic diamines selected from a compound group represented by the following chemical formulae (102), (103), (104), (105), (106), (109) and (110):

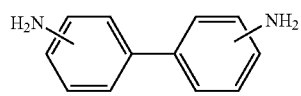
(102)

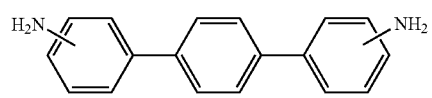
(103)

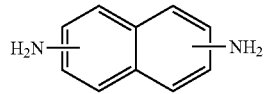
(104)

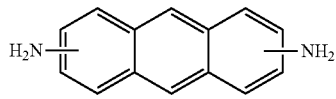
(105)

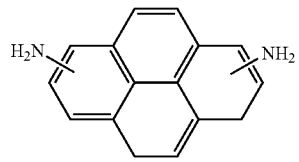
(106)

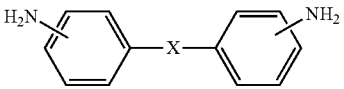
(109)

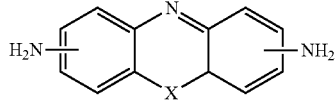
(110)

where X's each independently have any one of the following structures: —$CH_2$—, —CO—, —O—, —NH—, —CO—NH—, —S—, —SO—, and —$SO_2$—.

* * * * *